(12) United States Patent
Chong et al.

(10) Patent No.: US 11,352,595 B2
(45) Date of Patent: *Jun. 7, 2022

(54) BEVERAGE MAKING APPARATUS

(71) Applicant: LG ELECTRONICS INC., Seoul (KR)

(72) Inventors: Chungook Chong, Seoul (KR); Heeyeon Kim, Seoul (KR); Sunyoung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 404 days.

This patent is subject to a terminal disclaimer.

(21) Appl. No.: 15/598,813

(22) Filed: May 18, 2017

(65) Prior Publication Data

US 2017/0335258 A1 Nov. 23, 2017

Related U.S. Application Data

(60) Provisional application No. 62/338,498, filed on May 18, 2016.

(30) Foreign Application Priority Data

Aug. 19, 2016 (KR) .................. 10-2016-0105788
Dec. 8, 2016 (KR) .................. 10-2016-0166574

(51) Int. Cl.
 *C12C 13/00* (2006.01)
 *C12C 11/00* (2006.01)
(52) U.S. Cl.
 CPC ............ *C12C 13/00* (2013.01); *C12C 11/006* (2013.01)

(58) Field of Classification Search
 CPC .. A47J 31/465; A47J 31/3623; A47J 31/4403; A47J 31/60; A47J 31/407;
 (Continued)

(56) References Cited

U.S. PATENT DOCUMENTS 2,034,468 A * 3/1936 Heuser .................. C12C 11/003
 426/16
4,009,285 A * 2/1977 Spooner ................. C12G 1/064
 426/8
(Continued)

FOREIGN PATENT DOCUMENTS

CN 202072684 12/2011
CN 204111724 1/2015
(Continued)

OTHER PUBLICATIONS

Webster definition to "water" (Year: 2020).*
(Continued)

*Primary Examiner* — Tu B Hoang
*Assistant Examiner* — Bonita Khlok
(74) *Attorney, Agent, or Firm* — Fish & Richardson P.C.

(57) ABSTRACT

An apparatus includes a fermentation tank assembly including a fermentation tank having an opening formed therein and a fermentation tank cover configured to open and close the opening. The apparatus also includes an ingredient receiving portion configured to receive, through the opening of the fermentation tank, fermentation ingredients; a gas extraction flow path connected to the fermentation tank; a gas release valve disposed in the gas extraction flow path and configured to discharge gas from the fermentation tank; and a pressure sensor disposed on at least one of the gas extraction flow path or the fermentation tank cover.

14 Claims, 19 Drawing Sheets

(58) Field of Classification Search
CPC ...... A47J 31/46; A47J 31/369; A47J 31/3695; A47J 31/007; C12C 7/20–205; C12C 11/00–006; C12C 13/00–08; C12C 13/10; C12C 7/04
USPC ... 99/277.1, 277.2, 275, 276, 277, 278, 279, 99/280, 281, 282, 283, 285, 291, 295, 99/300, 308, 309, 310, 311, 312, 313, 99/348; 426/8, 7, 11
See application file for complete search history.

(56) References Cited

U.S. PATENT DOCUMENTS

| | | | |
|---|---|---|---|
| 4,708,938 A | | 11/1987 | Hickinbotham |
| 4,754,698 A | | 7/1988 | Naish |
| 5,992,300 A | * | 11/1999 | Fukushima ............. A47J 31/60 99/279 |
| 2010/0129490 A1 | * | 5/2010 | Williams ............. C12C 11/006 426/11 |
| 2014/0017354 A1 | * | 1/2014 | Joseph ..................... C12C 7/04 426/16 |
| 2014/0144328 A1 | | 5/2014 | Greene et al. |
| 2016/0201018 A1 | * | 7/2016 | Watson ................... A47J 27/08 426/11 |
| 2016/0326471 A1 | * | 11/2016 | Aown ..................... C12C 11/00 |

FOREIGN PATENT DOCUMENTS

| | | |
|---|---|---|
| CN | 105008511 | 10/2015 |
| CN | 105339483 | 2/2016 |
| CN | 205090659 | 3/2016 |
| DE | 202015106465 | 12/2015 |
| EP | 1961804 | 8/2008 |
| GB | 2335902 | 10/1999 |
| KR | 89-0001565 | 5/1989 |
| KR | 20-0319526 | 7/2003 |
| KR | 10-0813648 | 3/2008 |
| KR | 20120081903 | 7/2012 |
| WO | WO1999/050383 | 10/1999 |
| WO | 2009017428 | 2/2009 |
| WO | WO2009-017428 | 2/2009 |

OTHER PUBLICATIONS

Webster definition to "pack" (Year: 2020).*
Webster definition to "support" (Year: 2020).*
Webster definition to "mate" (Year: 2020).*
Webster definition to "seal" (Year: 2020).*
Extended European Search Report in European Application No. 17171797.8, dated Aug. 3, 2017, 10 pages (with English translation).
Korean Office Action in Korean Patent Appln. No. 10-2020-0050979, dated Sep. 30, 2020, 12 pages (with English translation).
Office Action in Chinese Appln. No. 201710343508.5, dated Apr. 7, 2020, 23 pages (with English translation).

* cited by examiner

BEVERAGE MAKING APPARATUS

CROSS-REFERENCE TO RELATED APPLICATIONS

This application claims the benefit of an earlier filing date and right of priority under 35 U.S.C. 119 and 365 to U.S. Provisional application No. 62/338,498, filed on May 18, 2016, and Korean Patent Applications Nos. 10-2016-0105788, filed on Aug. 19, 2016, and 10-2016-0166574, filed on Dec. 8, 2016 in the Korean Intellectual Property Office, the disclosures of which are incorporated herein by reference.

TECHNICAL FIELD

The present disclosure relates to a beverage ingredient pack and a beverage making apparatus having the same.

BACKGROUND

Various types of beverages are made via fermentation. Such beverages are typically made using various ingredients that are combined and fermented to yield the resulting beverage. As an example, beer is an alcoholic beverage that is brewed by filtering wort, adding hops to the wort, and then fermenting the resulting wort mixture with yeast. Wort is typically made with malt, which is made from germinated barley.

Ingredients for brewing beer typically include water, malt, hops, yeast, fragrance additives, and the like. The yeast is often referred to as leaven, and is typically added to malt to induce fermentation. The yeast may also facilitate the generation of alcohol and carbonic acid. In some scenarios, fragrance additives are added that improve the taste of beer, such as fruit, syrup, and vanilla bean additives.

SUMMARY

Implementations described herein provide a beverage-making apparatus that utilizes fermentation to make a beverage.

In one aspect, an apparatus includes a fermentation tank assembly including a fermentation tank having an opening formed therein and a fermentation tank cover configured to open and close the opening. The apparatus also includes an ingredient receiving portion configured to receive, through the opening of the fermentation tank, fermentation ingredients; a gas extraction flow path connected to the fermentation tank; a gas release valve disposed in the gas extraction flow path and configured to discharge gas from the fermentation tank; and a pressure sensor disposed on at least one of the gas extraction flow path or the fermentation tank cover.

In some implementations, the pressure sensor is disposed on the gas extraction flow path at a position that is closer to the fermentation tank than a position of the gas release valve.

In some implementations, the apparatus is configured to control the gas release valve and the pressure sensor to measure a pressure inside the gas extraction flow path using the pressure sensor while the gas release valve stops a discharge of gas from the fermentation tank through the gas extraction flow path.

In some implementations, the apparatus is configured to, based on the pressure sensor detecting a decrease in pressure in the gas extraction flow path, control the gas release valve to stop a discharge of gas from the fermentation tank through the gas extraction flow path.

In some implementations, the apparatus is further configured to control the gas release valve to stop a discharge of gas from the fermentation tank through the gas extraction flow path based on the pressure sensor detecting a decrease in pressure in the gas extraction flow path by: determining whether the decrease in pressure in the gas extraction flow path is within a threshold amount; based on a determination that the decrease in pressure in the gas extraction flow path is within the threshold amount, controlling the gas release valve to stop a discharge of gas from the fermentation tank through the gas extraction flow path; and based on a determination that the decrease in pressure in the gas extraction flow path is not within the threshold amount, controlling the gas release valve to discharge gas from the fermentation tank through the gas extraction flow path.

In some implementations, the apparatus is further configured to: control the gas release valve to stop a discharge of gas from the fermentation tank through the gas extraction flow path; and subsequently control the gas release valve to discharge gas from the fermentation tank through the gas extraction flow path after a period of time.

In some implementations, the apparatus is further configured to: control the gas release valve to discharge gas from the fermentation tank through the gas extraction flow path; and subsequently control the gas release valve to stop a discharge of gas from the fermentation tank through the gas extraction flow path after a period of time.

In some implementations, at least one portion of the gas extraction flow path is disposed at the outside of the fermentation tank assembly. The pressure sensor and the gas release valve are disposed at the at least one portion of the gas extraction flow path outside of the fermentation tank assembly.

In some implementations, the apparatus is further configured to: receive a user input indicating a target level of carbonation; and based on the user input, control the gas release valve to discharge gas from the fermentation tank through the gas extraction flow path.

In another aspect, an apparatus includes a fermentation tank assembly including a fermentation tank having an opening formed therein and a fermentation tank cover configured to open and close the opening. The apparatus also includes an ingredient pack receiving portion configured to receive, through the opening of the fermentation tank, an ingredient pack containing fermentation ingredients therein; a gas extraction flow path connected to the fermentation tank and configured to release gas from the ingredient pack mounted in the fermentation tank; and a gas release valve disposed in the gas extraction flow path and configured to control the release of gas from the ingredient pack in a state in which the ingredient pack is mounted in the fermentation tank.

In some implementations, the ingredient pack receiving portion includes a seat portion configured to support an upper part of the ingredient pack in a state in which the ingredient pack is mounted in the fermentation tank.

In some implementations, the ingredient pack receiving portion further includes a sealing member configured to mate with an upper part of the ingredient pack and seal a space between an exterior of the ingredient pack and an interior wall of the fermentation tank.

In some implementations, in a state in which the ingredient pack is mounted in the fermentation tank and the fermentation tank cover is closed, the gas extraction flow path is communicative with a gas discharge opening of the ingredient pack that provides access to an interior of the ingredient pack.

In some implementations, apparatus further includes: a pressure sensor disposed on at least one of the gas extraction flow path or the fermentation tank cover, and configured to measure a pressure inside the ingredient pack in a state in which the ingredient pack is mounted in the fermentation tank and the fermentation tank cover is closed.

In some implementations, the pressure sensor is disposed on the gas extraction flow path at a position that is closer to the fermentation tank than a position of the gas release valve.

In some implementations, the apparatus is configured to control the gas release valve and the pressure sensor to measure a pressure inside the ingredient pack while the gas release valve stops a discharge of gas from ingredient pack.

In some implementations, the apparatus is configured to, based on the pressure sensor detecting a decrease in pressure inside the ingredient pack, control the gas release valve to stop a discharge of gas from the ingredient pack.

In some implementations, the apparatus is further configured to control the gas release valve to stop a discharge of gas from the ingredient pack based on the pressure sensor detecting a decrease in pressure in the ingredient pack by: determining whether the decrease in pressure is within a threshold amount; based on a determination that the decrease in pressure is within the threshold amount, controlling the gas release valve to stop a discharge of gas from the ingredient pack; and based on a determination that the decrease in pressure is not within the threshold amount, controlling the gas release valve to discharge gas from the ingredient pack.

In some implementations, the apparatus is further configured to: control the gas release valve to stop a discharge of gas from the ingredient pack; and subsequently control the gas release valve to discharge gas from the ingredient pack after a period of time.

In some implementations, the apparatus is further configured to: control the gas release valve to discharge gas from the ingredient pack; and subsequently control the gas release valve to stop a discharge of gas from the ingredient pack after a period of time.

Further scope of applicability of the present disclosure will become apparent from the detailed description given hereinafter. However, it should be understood that the detailed description and specific examples, while indicating preferred implementations of the disclosure, are given by illustration only, since various changes and modifications within the spirit and scope of the disclosure will become apparent from this detailed description.

DETAILED DESCRIPTION

Figure 1:
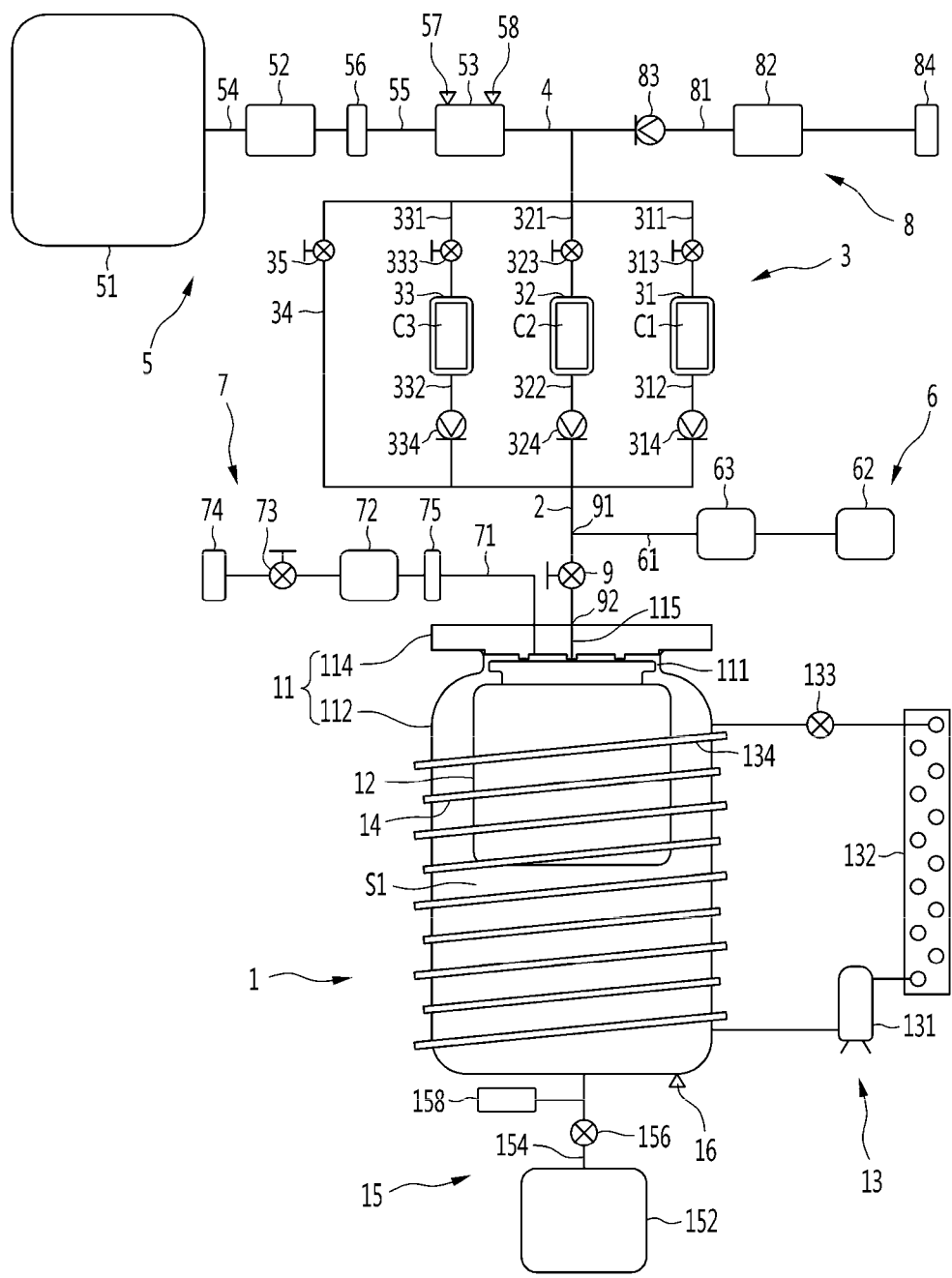
FIG. 1 is a diagram illustrating an example of a beverage maker according to some implementations.

Implementations described herein provide a beverage-making apparatus configured to provide improved brewing of a beverage by selectively discharging gas generated in a fermenting step during a beverage brewing process.

In some implementations, the beverage-making apparatus is configured to measure a fermentation degree of the beverage and control a fermenting step.

According to some implementations, the beverage maker may properly discharge gas generated in the fermenting process during beverage brewing through the gas extraction flow path by turning on or off the gas extraction valve. Gas generated in beverage fermentation may be properly discharged, so as to reduce the pressure build-up in the beverage brewing process from being excessively increased.

Further, the pressure generated during the beverage brewing process may be measured through the pressure sensor, so that a fermentation degree may be determined by measuring a change in pressure in the beverage brewing beverage during fermentation.

Further, the pressure generated in the beverage brewing process may be measured through the pressure sensor, so that a primary fermentation completion time may be determined by measuring a change in pressure in the beverage brewing process during fermentation.

Further, the pressure generated in the beverage brewing process can be measured through the pressure sensor, so that a secondary fermentation initiation time can be determined by measuring a change in pressure in the beverage brewing process during fermentation.

Further, the pressure generated in the beverage brewing process may be measured through the pressure sensor, so that a secondary fermentation completion time may be determined by measuring a change in pressure in the beverage brewing process during fermentation.

Further, gas in the beverage brewing process may be discharged through a gas discharge relief valve, so as to reduce the pressure build-up in the beverage brewing process from being rapidly increased.

Further, an air filter may be provided in the gas extraction flow path, so that impurities of gas discharged from the beverage brewing process may be filtered and discharged.

Further, the beverage making apparatus may automatically determine whether the fermentation of the beverage has been completed, using the pressure sensor and the gas extraction valve, and may automatically proceed with a ripening process when the fermentation is completed. As such, the beverage may be conveniently brewed while minimizing the manipulation of a user.

Further, a fermentation completion time may be more accurately determined, so that the quality of beverage brewed by the beverage maker may be made more consistent.

Further, a fermentation degree of the beverage may be sensed by using a pressure sensor and a gas extraction valve that are in non-contact with the beverage, so that the beverage can be more cleanly brewed. In addition, this may reduce beverage residues from being attached to the pressure sensor, so that the accuracy of the pressure sensor is better maintained.

Hereinafter, some implementations of the present disclosure will be described in detail with reference to the accompanying drawings.

Some of the examples below describe a scenario in which the beverage-making apparatus is specifically a beer-making apparatus. However, implementations are not limited thereto, and may be implemented as any suitable beverage making apparatus that utilizes fermentation.

FIG. 1 is an entire configuration view of a beverage maker according to an implementation.

The beverage making apparatus, as shown in FIG. 1, may include a fermentation module 1, an ingredient supplier 3 (or simply supplier 3) connected to the fermentation module 1 through a main flow path 2, a water supply module 5 connected to the supplier 3 through a water supply flow path 4, and a beverage extractor 6 that allows a beverage fermented in the fermentation module 1 to be extracted to the outside.

The fermentation module 1 includes a container, for example fermentation tank assembly 11, having a space S1 formed therein. The container may include a container body, such as fermentation tank 112, and a container cover, such as fermentation tank cover 114.

In the example of FIG. 1, the fermentation tank assembly 11 includes a fermentation tank 112 has an opening 111 formed at an upper portion thereof, the fermentation tank 112 having the space S1 formed therein, and a fermentation tank cover 114 covering the opening 111.

The fermentation tank 112 may be configured as an assembly of a plurality of members.

The fermentation tank cover 114 is used to seal the inside of the fermentation tank 112, and may be disposed at an upper portion of the fermentation tank 112 to cover the opening 111. A main flow path connecting part 115 connected to the main flow path 2 may be formed in the fermentation tank cover 114.

In addition, the fermentation module 1 may further include a removable beverage ingredient pack 12 that holds at least some of the ingredients for making the beverage. As shown in the example of FIG. 1, the beverage ingredient pack 12 may be a beverage ingredient pack that is inserted and accommodated in the fermentation tank assembly 11.

In this example, the beverage ingredient pack 12 may be a pack in which ingredients for brewing beverage are accommodated. In some implementations, beverage ingredient pack 12 may also accommodate therein at least part of a brewing process for the beverage. As such, beverage ingredient pack 12 may also be referred to as a beverage brewing pack 12.

The beverage brewing pack 12 may be formed smaller than the space S1 formed in the fermentation tank assembly 11. The beverage brewing pack 12 may be inserted and accommodated in the fermentation tank 11 in a state in which the ingredients are accommodated therein. The beverage brewing pack 12 may be inserted into the fermentation tank 112 to be accommodated in the fermentation tank 112 in a state in which the opening 111 of the fermentation tank 112 is opened. The fermentation tank cover 114 may cover the opening 111 of the fermentation tank 112 after the beverage brewing pack 12 is inserted into the fermentation tank 112. The beverage brewing pack 12 may assist the ingredients to be fermented in a state in which the beverage brewing pack 12 is accommodated in the space S1 sealed by the fermentation tank 112 and the fermentation tank cover 114. The beverage brewing pack 12 may be expanded by a pressure therein while the beverage is being brewed.

As an example, for a beer maker, the ingredients for brewing the beer may include water, malt, yeast, hops, fragrance additives, and the like.

The beverage maker may include both of the ingredient supplier 3 and the beverage ingredient pack 12, and the ingredients for brewing the beverage may be distributed and accommodated in the supplier 3 and the beverage ingredient pack 12. Some ingredients among the ingredients for brewing the beverage may be accommodated in the beverage ingredient pack 12, and the other ingredients may be accommodated in the supplier 3. The other ingredients accommodated in the supplier 3 may be supplied to the beverage ingredient pack 12 together with water supplied from the water supply module 5, and be mixed with the ingredients accommodated in the beverage ingredient pack 12.

In some implementations, an ingredient essential to brew the beverage may be accommodated in the beverage ingredient pack 12, and additives added to the main ingredient may be accommodated in the ingredient supplier 3. In this case, the additives accommodated in the supplier 3 may be mixed with the water supplied from the water supply module 5 to be supplied to the beverage ingredient pack 12, and be mixed with the main ingredient accommodated in the beverage ingredient pack 12.

As an example, the main ingredient accommodated in the beverage ingredient pack 12 may be an ingredient having a larger volume than the other ingredients. For example, in the case of a beer maker, the beverage ingredient pack 12 may hold an ingredient such as malt, while the ingredient supplier 3 may hold other ingredients or additives such as yeast, hops, fragrance additives, and the like.

In some implementations, the beverage maker does not include both of the beverage ingredient pack 12 and the ingredient supplier 3 as described above, but may include only the supplier 3 without any separate beverage ingredient pack 12. All of the ingredients for brewing the beverage may be accommodated in the supplier 3. In this case, all of the ingredients accommodated in the supplier 3 may be supplied to the inside of the fermentation tank assembly 11 together with the water supplied from the water supply module 5. The main ingredient and the additives may be accommodated together in the supplier 3. The main ingredient and additives, which are accommodated in the supplier 3, may be simultaneously supplied to the inside of the fermentation tank assembly 11 or be sequentially supplied with a time difference.

In some implementations, the beverage maker does not include any separate beverage ingredient pack 12, but may directly inject some ingredients among the ingredients for brewing the beverage into the fermentation tank assembly 11 and allow the other ingredients for brewing the beverage to be accommodated in the ingredient supplier 3. In this case, a user may directly inject the main ingredient into the fermentation tank assembly 11, and the additives may be accommodated in the supplier 3. The additives accommodated in the supplier 3 may be mixed with the water supplied from the water supply module 5, and be mixed with the main ingredient previously injected into the fermentation tank assembly 11.

In some implementations, the beverage maker does not include the ingredient supplier 3, but may include the beverage ingredient pack 12. In this case, the main ingredient may be accommodated in the beverage ingredient pack 12, and the user may directly inject the additives into the beverage ingredient pack 12.

In some implementations, the beverage maker does not include neither the ingredient supplier 3 nor the beverage ingredient pack 12, but instead a user may directly inject the main ingredient and the additives simultaneously or with a time difference into the fermentation tank assembly 11.

When the beverage maker includes both of the ingredient supplier 3 and the beverage ingredient pack 12, the beverage can be more conveniently brewed. Hereinafter, the case where the beverage maker includes both of the supplier 3 and the beverage ingredient pack 12 is described as an example. However, it will be apparent that the present disclosure is not limited to the case where the beverage maker includes both of the ingredient supplier 3 and the beverage ingredient pack 12.

The ingredients injected into the beverage ingredient pack 12 may be fermented as time elapses. The beverage that has been completely brewed in the beverage ingredient pack 12 may flow in the main flow path 2 through the main flow path connecting part 115, and flow from the main flow path 2 to the beverage extractor 6 to be extracted from the beverage extractor 6.

The fermentation module 1 may further include a temperature controller that changes a temperature of the fermentation tank assembly 11. As the temperature controller heats or cools the fermentation tank assembly 11, the temperature of the fermentation tank assembly 11 can be controlled to an optimum temperature for brewing the beverage.

The temperature controller may include a refrigeration cycle apparatus 13 including a compressor 131, a condenser 132, an expansion device 133, and an evaporator 134, and any one of the condenser 132 and the evaporator 134 may be disposed at the fermentation tank assembly 11.

When the condenser 132 is disposed in contact with the fermentation tank 112, the refrigeration cycle apparatus 13 may control a temperature of the fermentation tank 112 by heating the fermentation tank 112. In this case, the condenser 132 may be disposed in contact with the outer surface of the fermentation tank 112. The condenser 132 may include a condensing tube wound around the outer surface of the fermentation tank 112.

When the evaporator 134 is disposed in contact with the fermentation tank 112, the refrigeration cycle apparatus 13 may control the temperature of the fermentation tank 112 by cooling the fermentation tank 112. In this case, the evaporator 134 may be disposed in contact with the outer surface of the fermentation tank 112. The evaporator 134 may include an evaporating tube wound around the outer surface of the fermentation tank 112. The evaporating tube may be accommodated between the fermentation tank 112 and a heat insulating wall 102 (see FIGS. 3 and 4), and cool the inside of a heat insulating space S2 heat-insulated by the heat insulating wall 102.

The temperature controller may further include a heater 14 that heats the fermentation tank assembly 11. The heater 14 may be disposed in contact with the outer surface of the fermentation tank 112, and be configured as a heater that generates heat when power is applied thereto. The heater 14 may be configured as a line heater, and be wound around the outer surface of the fermentation tank 112.

The refrigeration cycle apparatus 13 may be configured as a heat pump. The refrigeration cycle apparatus 13 may include a flow path switching valve. The flow path switching valve may be configured as a four-way valve. The flow path switching valve may be connected to each of an inlet flow path of the compressor 131 and an outlet flow path of the compressor 131. The flow path switching valve may be connected to the condenser 132 through a condenser connection flow path, and be connected to the evaporator 134 through an evaporator connection flow path.

When the fermentation tank 112 is cooled, the flow path switching valve may guide a refrigerant compressed by the compressor 131 to the condenser 132 and guide the refrigerant discharged from the evaporator 134 to the compressor 131.

When the fermentation tank 112 is heated, the flow path switching valve may guide the refrigerant compressed by the compressor 131 to the evaporator 134 and guide the refrigerant discharged from the condenser 132 to the compressor 131.

The beverage maker may include a beverage extraction pressurizing device 15 that injects air between the beverage ingredient pack 12 and the fermentation tank assembly 11. In a state in which the beverage ingredient pack 12 is accommodated in the fermentation tank assembly 11, the beverage extraction pressurizing device 15 may inject air between the beverage ingredient pack 12 and the fermentation tank assembly 11, and the air injected into the fermentation tank assembly 11 may pressurize the beverage ingredient pack 12. The beverage in the beverage ingredient pack 12 may be pressurized by the air, and flow in the main flow path 2 by passing through the main flow path connecting part 115. The beverage flowing in the main flow path 2 from the beverage ingredient pack 12 may be extracted to the outside through the beverage extractor 6.

That is, in the beverage maker, if the beverage is completely brewed, the beverage in the beverage ingredient pack 12 may be extracted through the beverage extractor 6 in a state in which the beverage ingredient pack 12 is not taken out of the fermentation tank assembly 11 but located in the fermentation tank assembly 11.

The beverage extraction pressurizing device 15 may include an air pump 152 that pumps air and an air supply flow path 154 that connects the air pump 152 and the inside of the fermentation tank assembly 11. The beverage extraction pressurizing device 15 may further include an air control valve 156 installed in the air supply flow path 154. The beverage extraction pressurizing device 15 may further include an air relief valve 158 provided to the air supply flow path 154. The air relief valve 158 may be installed posterior to the air control valve 156 in an air supply direction in the air supply flow path 154.

The air control valve 156 may be opened only when the beverage is extracted to allow air to be introduced into the fermentation tank assembly 11, and maintain a closed state while the beverage is not being extracted.

The beverage maker may further include a temperature sensor 16 that measures a temperature of the fermentation tank assembly 11. The temperature sensor 16 may be installed to measure a temperature of the fermentation tank 112.

Hereinafter, the ingredient supplier 3 will be described as follows.

The supplier 3 may be connected to a water supply heater 53 through the water supply flow path 4, and be connected to the fermentation tank assembly 11 through the main flow path 2.

The ingredient supplier 3 may accommodate ingredients required to brew the beverage therein, and be configured to allow water supplied from the water supply module 5 to pass therethrough. For example, in the case of beer, the ingredients accommodated in the supplier 3 may be yeast, hops, fragrance additives, and the like.

The ingredients accommodated in the supplier 3 may be directly accommodated in an ingredient accommodation part formed in the supplier 3. At least one ingredient accommodation part may be formed in the supplier 3. A plurality of ingredient accommodation parts may be formed in the supplier 3. In this case, the plurality of ingredient accommodation parts may be formed to be divided from one another.

Meanwhile, the ingredients accommodated in the ingredient supplier 3 may be accommodated in an ingredient package (e.g., a capsule), and at least one ingredient package accommodation part in which the ingredient package is accommodated may be formed in the supplier 3. When the ingredients are accommodated in the ingredient package in the form of a capsule, the supplier 3 may be configured such that the capsule is mountable and extractable. The supplier 3 may be configured as a capsule kit assembly in which the capsule is separably accommodated. The following will describe examples of an ingredient package as a capsule, although implementations are not limited thereto.

Each of the main flow path 2 and the water supply flow path 4 may be connected to the supplier 3. The water supplied through the water supply flow path 4 may be mixed with the ingredients by passing through the ingredient accommodation part or the capsule. The ingredients accommodated in the ingredient accommodation part or the capsule may flow in the main flow path 2 together with the water.

A plurality of different kinds of additives may be separated from one another to be accommodated in the supplier 3. As an example, for a beer maker, the plurality of additives accommodated in the supplier 3 may be yeast, hops, and fragrance additives, and be separated from one another to be accommodated in the supplier 3.

When a plurality of ingredient accommodation parts are formed in the supplier 3, each of the plurality of ingredient accommodation parts may be connected to the water supply flow path through a supplier entrance flow path, and be connected to the main flow path 2 through a supplier exit flow path.

When a plurality of capsule accommodation parts are formed in the supplier 3, each of the plurality of capsule accommodation parts may be connected to the water supply flow path 4 through the supplier entrance flow path, and be connected to the main flow path 2 through the supplier exit flow path.

The ingredient accommodation part of the supplier 3 and the capsule accommodation part of the supplier 3 may be the substantially same component. When the capsule is inserted into the supplier 3 in a state in which the ingredients are accommodated in the capsule, the component may be referred to as the capsule accommodation part. When the ingredients are directly accommodated in the supplier 3 in a state in which the ingredients are not contained in the capsule, the component may be referred to as the ingredient accommodation part. Since the ingredient accommodation part and the capsule accommodation part may be the substantially same component, it will be described below that, for convenience of description, the capsule accommodation part is formed in the supplier 3.

The capsule accommodation part in which a capsule containing additives is attachably/detachably accommodated may be formed in the supplier 3. The supplier 3 may be connected to the water supply flow path 4 through the supplier entrance flow path, and be connected to the main flow path 2 through the supplier exit flow path.

An opening/closing valve that opens/closes the supplier entrance flow path may be installed in the supplier entrance flow path.

A check valve that blocks a fluid of the main flow path 2 from flowing backward to the capsule accommodation part may be installed in the supplier exit flow path.

A plurality of capsule accommodation parts 31, 32, and 33 may be formed in the supplier 3. The plurality of capsule accommodation parts 31, 32, and 33 may be formed to be divided from one another. The plurality of capsule accommodation parts 31, 32, and 33 may be connected to supplier entrance flow paths and supplier exit flow paths, respectively.

Hereinafter, a first additive, a second additive, and a third additive may be accommodated in the supplier 3. As an example, for a beer maker, the first additive may be yeast, the second additive may be hop, and the third additive may be a fragrance additive.

The supplier 3 may include a first capsule accommodation part 31 in which a first capsule C1 containing the first additive is accommodated, a second capsule accommodation part 32 in which a second capsule C2 containing the second additive is accommodated, and a third capsule accommodation part 33 in which a third capsule C3 containing the third additive is accommodated.

A first supplier entrance flow path 311 that guides water or air to the first capsule accommodation part 31 may be connected to the first capsule accommodation part 31, and a first supplier exit flow path 312 through which water discharged from the first capsule accommodation part 31, a mixture of the water and the first additive, and air are guided may be connected to the first capsule accommodation part

31. A first opening/closing valve 313 that opens/closes the first supplier entrance flow path 311 may be installed in the first supplier entrance flow path 311. A first check valve 314 that blocks the fluid of the main flow path 2 from flowing backward to the first capsule accommodation part 31 while allowing a fluid of the first capsule accommodation part 31 to flow in the main flow path 2 may be installed in the first supplier exit flow path 312. Here, the fluid may include the water discharged from the first capsule accommodation part 31, the mixture of the water and the first additive, and the air.

A second supplier entrance flow path 321 that guides water or air to the second capsule accommodation part 32 may be connected to the second capsule accommodation part 32, and a second supplier exit flow path 322 through which water discharged from the second capsule accommodation part 32, a mixture of the water and the second additive, and air are guided may be connected to the second capsule accommodation part 32. A second opening/closing valve 323 that opens/closes the second supplier entrance flow path 321 may be installed in the second supplier entrance flow path 321. A second check valve 324 that blocks the fluid of the main flow path 2 from flowing backward to the second capsule accommodation part 32 while allowing a fluid of the second capsule accommodation part 32 to flow in the main flow path 2 may be installed in the second supplier exit flow path 322. Here, the fluid may include the water discharged from the second capsule accommodation part 32, the mixture of the water and the second additive, and the air.

A third supplier entrance flow path 331 that guides water or air to the third capsule accommodation part 33 may be connected to the third capsule accommodation part 33, and a third supplier exit flow path 332 through which water discharged from the third capsule accommodation part 33, a mixture of the water and the third additive, and air are guided may be connected to the third capsule accommodation part 33. A third opening/closing valve 323 that opens/closes the third supplier entrance flow path 331 may be installed in the third supplier entrance flow path 331. A third check valve 334 that blocks the fluid of the main flow path 2 from flowing backward to the third capsule accommodation part 33 while allowing a fluid of the third capsule accommodation part 33 to flow in the main flow path 2 may be installed in the third supplier exit flow path 332. Here, the fluid may include the water discharged from the third capsule accommodation part 33, the mixture of the water and the third additive, and the air.

The beverage maker may include a bypass flow path 34 that enables the water supplied from the water flow path 4 to be supplied to the main flow path 2 by bypassing the capsule accommodation parts 31, 32, and 33.

The bypass flow path 34 may be connected to the water supply flow path 4 and the main flow path 2, and water or air of the water flow path 4 may be guided to the bypass flow path 34 to flow in the main flow path 2 by bypassing the capsule accommodation parts 31, 32, and 33.

The bypass flow path 34 may be connected in parallel to flow paths of the first capsule accommodation part 31, the second capsule accommodation part 32, and the third capsule accommodation part 33.

A bypass valve 35 that opens/closes the bypass flow path 34 may be installed in the bypass flow path 34.

The beverage maker may include a main supply flow path that guides the water, the ingredients of the beverage, or the air to the fermentation tank assembly 11 therethrough.

When the beverage maker includes both of the supplier 3 and the water supply module 5, the main supply flow path may include all of the main flow path 2, the bypass flow path 34, and the water supply flow path 4. In this case, the main supply flow path may supply all of the water, the air, and the ingredients of the beverage to the fermentation tank assembly 11.

The beverage maker includes the supplier 3, but may not include the water supply module 5. In this case, the main supply flow path may include all of the main flow path 2, the bypass flow path 34, and the water supply flow path 4. The water supply flow path 4 may be directly connected to a water faucet or include a water supply tube that is connected to the water faucet through a separate connection hose to be supplied with external water. The water supply tube may be supplied with external water to supply the external water to the bypass flow path 34 or the supplier 3. That is, the main supply flow path may supply all of the water, the air, and the ingredients of the beverage to the fermentation tank assembly 11 therethrough.

The beverage maker includes the water supply module 5, but may not include the supplier 3. In this case, the main supply flow path may include the main flow path 2, and the main flow path 2 may be directly connected to the water supply module 5. In addition, an air injection flow path 81 of an air injector 8 may be connected to the main flow path 2.

When the beverage maker includes the water supply module 5 but does not include the supplier 3, the main supply flow path does not require a separate water supply flow path 4 or bypass flow path 34 that connects the water supply module 5 and the supplier 3, and the main flow path 2 may be directly supplied from the water supply module 5. In addition, the air injection flow path 81 of the air injector 8 may be connected to a portion located between the water supply module 5 and a main valve 9 in the main flow path 2.

When the beverage maker includes the water supply module 5 but does not include the supplier 3, water of the water supply module 5 may be supplied to the fermentation tank assembly 11 through the main flow path 2, and air of the air injector 8 may be supplied to the fermentation tank assembly 11 through the main flow path 2. That is, the main flow path may supply water and air to the fermentation tank assembly 11.

The beverage maker may not include both of the supplier 3 and the water supply module 5. In this case, the main supply flow path may include the main flow path 2, and the main flow path 2 may be directly connected to a water faucet or include a water supply tube that is connected to the water faucet through a separate connection hose to be supplied with external water. The water supply tube may be supplied with external water to supply the external water to the fermentation tank assembly 11.

When the beverage maker does not include both of the supplier 3 and the water supply module 5, the main supply flow path does not require a separate water supply flow path 4 or bypass flow path 34 that connects the water supply module 5 and the supplier 3, and the main flow path 2 may be directly supplied from the water supply module 5. In this case, the air injection flow path 81 of the air injector 8 may be connected to the main flow path 2, and be connected prior to the main valve 9 in the main flow path 2. That is, the main supply flow path may supply water and air to the fermentation tank assembly 11.

Hereinafter, the case where the beverage maker includes all of the main flow path 2, the water supply flow path 4, and the bypass flow path 34 will be described as an example.

The main flow path 2 may be connected to the first supplier exit flow path 312, the second supplier exit flow path 322, the third supplier exit flow path 332, and the bypass flow path 34. The main flow path 2 may include a common tube connected to the fermentation tank assembly 11 and a combination tube connected to the first supplier exit flow path 312, the second supplier exit flow path 322, the third supplier exit flow path 332, the bypass flow path 34 and the common tube.

The main flow path 2 may be connected to the fermentation tank assembly 11, and be connected to the fermentation tank cover 114 in the fermentation tank assembly 11.

The water supply flow path 4 may be connected to the first supplier entrance flow path 311, the second supplier entrance flow path 321, the third supplier entrance flow path 331, and the bypass flow path 34.

The water supply flow path 4 may include a common tube connected to the water supply module 5, and a plurality of branch tubes branching off from the common tube, the plurality of branch tubes being connected to the first supplier entrance flow path 311, the second supplier entrance flow path 321, the third supplier entrance flow path 331, and the bypass flow path 34.

The water supply module 5 may include a water tank 51 containing water, a water supply pump 52 that pumps the water of the water tank 51, and the water supply heater 53 that heats the water pumped by the water supply pump 52.

A water tank outlet flow path 54 may be connected to the water tank 51, and the water supply pump 52 may be connected to the water tank outlet flow path 54.

A water supply pump outlet flow path 55 may be connected to the water supply pump 52, and the water supply heater 53 may be connected to the water supply pump outlet flow path 55.

A flow meter 56 that measures a flow rate of the water supply pump outlet flow path 55 may be installed in the water supply pump outlet flow path 55.

The water supply heater 53 may be a mold heater, and include a heater case through which the water pumped by the water supply pump 52 passes, and a heater installed in the heater case to heat water introduced into the heater case. A thermistor 57 that measures a temperature of the water supply heater 53 may be installed in the water supply heater 53. In addition, a thermal fuse 58 that cuts off current applied to the water supply heater 53 as a circuit is interrupted when the temperature of the water supply heater 53 is high.

When the water supply pump 52 is driven, water of the water tank 51 may be guided to the water supply heater 53 through the water tank outlet flow path 54, the water supply pump 52, and the water supply pump outlet flow path 55. The water guided to the water heater 53 may be heated by the water supply heater 53 and then guided to the water supply flow path 4.

The beverage extractor 6 may be connected to the main flow path 2. The beverage extractor 6 may include a beverage extraction flow path 61 connected to the main flow path 2, the beverage extraction flow path 61 allowing the beverage of the main flow path 2 to be guided therethrough. The beverage extractor 6 may further include a beverage extraction valve 62 connected to the beverage extraction flow path 61.

An anti-foaming path 63 may be provided in the beverage extraction flow path 61, and foam of the beverage flowing from the main flow path 2 to the beverage extraction flow path 61 may be minimized by passing through the anti-foaming path 63. A mesh, etc., through which foam is filtered, may be provided in the anti-foaming path 63.

The beverage extraction valve 62 may include a lever manipulated by the user and a tap valve having a micro switch that detects a manipulation of the user.

Meanwhile, the beverage maker may further include a gas discharger that discharges gas in the fermentation module 1 to the outside.

The gas discharger 7 may include a gas extraction flow path 71 connected to the fermentation module 1 and a pressure sensor 72 installed in the gas extraction flow path 71. The gas discharger 7 may further include a gas extraction valve 73 that opens/closes the gas extraction flow path 71. The gas discharger 7 may further include an air filter 74 through which gas passing through the gas extraction valve 73 passes.

The gas extraction flow path 71 may be connected to the fermentation tank assembly 11, particularly, the fermentation tank cover 114.

The gas extraction valve 73 may be turned on when air is injected into the beverage ingredient pack 12, to be opened. The beverage maker may allow an ingredient (e.g., malt for a beer maker) and water to be uniformly mixed together by injecting air into the beverage ingredient pack 12. As such, in the case of beer making, bubbles generated from the liquidized malt may be discharged to the outside at an upper portion of the beer brewing pack 12 through the gas extraction flow path 71 and the gas extraction valve 73.

The gas extraction valve 73 may be opened to detect a fermentation degree during a fermentation process. The gas in the beverage brewing pack 12 may flow in the pressure sensor 72. The pressure sensor 72 may sense a pressure of the gas discharged from the beverage brewing pack 12.

The pressure sensor 72, the gas extraction valve 73, and the air filter 74 may be sequentially disposed in a gas discharge direction in the gas extraction flow path 71.

The gas discharger 7 may further include a gas discharge relief valve 75 provided in the gas extraction flow path 71. The gas discharge relief valve 75 may be installed prior to the pressure sensor 72 in the gas discharge direction.

The beverage maker may further include the air injector 8 connected to at least one of the main flow path 2 and the water supply flow path 4 to inject air.

When the air injector 8 is connected to the water supply flow path 4, air may be injected into the supplier 3 through the water supply flow path 4. The air injected into the water supply flow path 4 may sequentially pass through the supplier 3 and the main flow path 2 and then be injected into the beverage brewing pack 12. When the air injector 8 is connected to the water supply flow path 4, air may be injected into the beverage brewing pack 12 through the water supply flow path 4, the bypass flow path 34, and the main flow path 2. The air injector 8 may supply the air to ingredients in the beverage brewing pack 12.

When the air injector 8 is connected to the water supply flow path 4, air may be injected into the capsule accommodation parts 31, 32, and 33 through the water supply flow path 4, remaining water or sludge in the capsules C1, C2, and C3 and the capsule accommodation parts 31, 32, and 32 may flow in the main flow path 2, and the capsules C1, C2, and C3 and the capsule accommodation parts 31, 32, and 32 may be cleanly maintained.

The air injector 8 may include the air injection flow path 81 connected to the water supply flow path 4 and an air injection pump 82 that pumps air to the air injection flow path 81.

The air injector 8 may further include a check valve 83 that blocks the water of the water supply flow path 4 from being introduced into the air injection pump 82 through the air injection flow path 81. The check valve 83 may be installed posterior to the air injection pump 82 in an air injection direction.

The air injector 8 may further include an air filter 84 connected to the air injection flow path 81, the air filter 84 being installed prior to the air injection pump 82 in the air injection direction.

When the air injection pump 82 is driven, dust, etc. in air may be filtered by the air filter 84, and the air passing through the air filter 84 may be flowed by the air injection pump 82 to flow in the water supply flow path 4.

The beverage maker may further include the main valve 9 that opens/closes the main flow path 2.

The main valve 9 may be installed, in the main flow path 2, between a connection part 91 of the main flow path 2 and the beverage extraction flow path 61 and a connection part 92 of the main flow path 2 and the fermentation tank assembly 11.

The main valve 9 may be opened when hot water is injected into the beverage ingredient pack 12, to open the main flow path 2. The main valve 9 may be closed while the fermentation tank assembly 11 is cooled, to close the main flow path 2. The main valve 9 may be opened when air is injected into the beverage ingredient pack 12, to open the main flow path 2. The main valve 9 may be opened when an additive is supplied to the inside of the beverage ingredient pack 12, to open the main flow path 2. The main valve 9 may be closed while ingredients are being fermented, to close the inside of the beverage ingredient pack 12. The main valve 9 may be closed when the beverage is ripened and kept, to close the inside of the beverage ingredient pack 12. The main valve 9 may be opened when the beverage is extracted from the beverage extractor 6, to open the main flow path 2.

Figure 2:
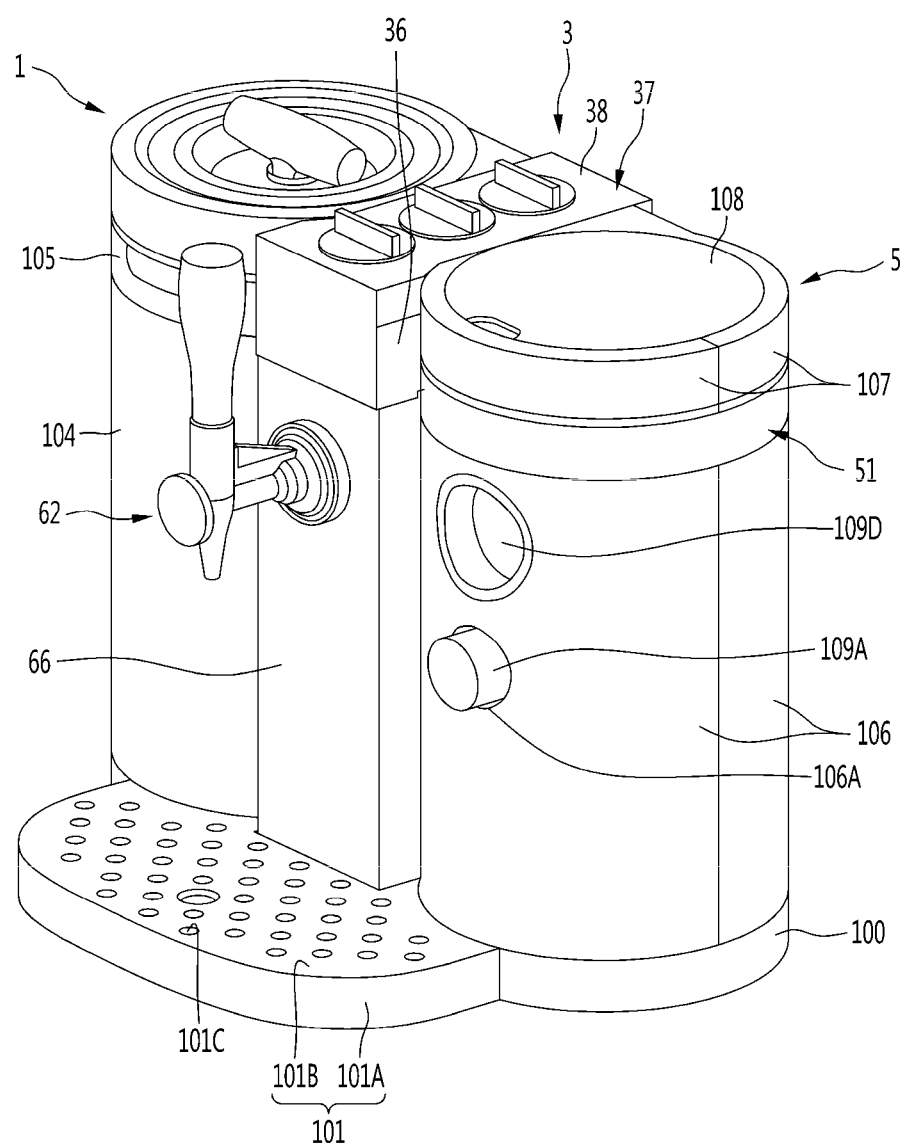
FIG. 2 is a diagram illustrating an example of a perspective view of the beverage maker according to some implementations.
Figure 3:
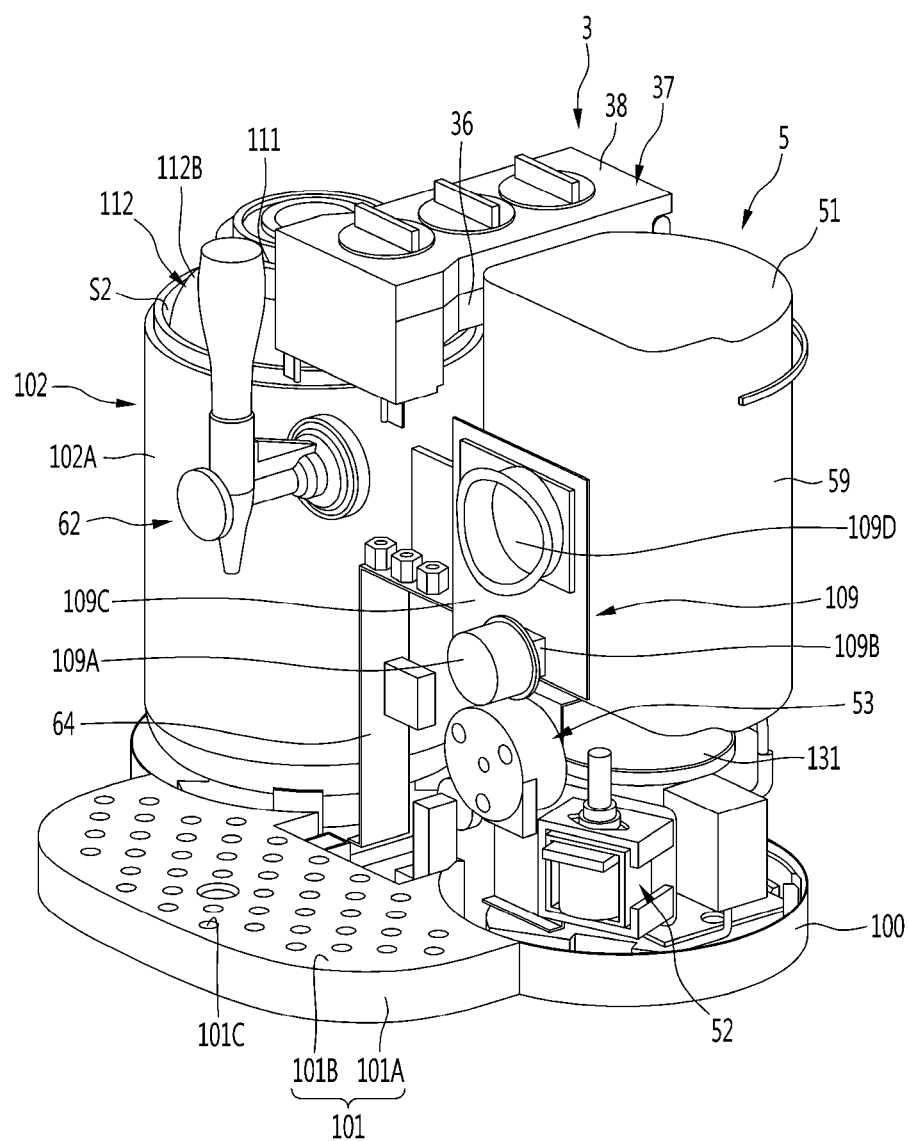
FIG. 3 is a diagram illustrating an example of a perspective view of an inside of the beverage maker according to some implementations.
Figure 4:
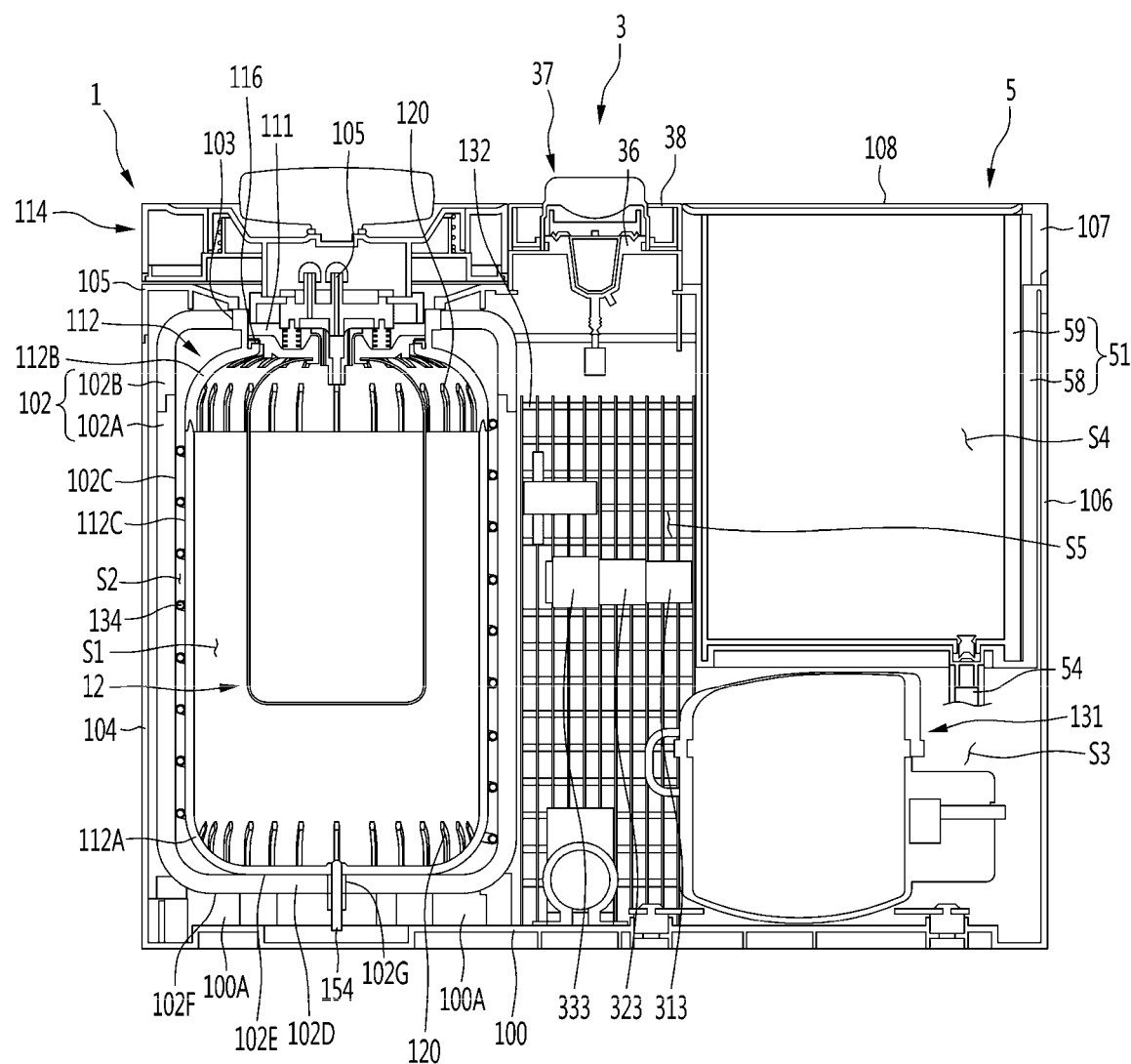
FIG. 4 is a diagram illustrating an example of a front view of an inside of the beverage maker according to some implementations.

FIG. 2 is a perspective view of the beverage maker according to some implementations. FIG. 3 is a perspective view illustrating an inside of the beverage maker according to some implementations. FIG. 4 is a front view illustrating an inside of the beverage maker according to some implementations.

The beverage maker may further include a base 100. The base 100 may form a bottom appearance of the beverage maker, and support the fermentation tank assembly 11, the compressor 131, the water supply heater 53, the water supply pump 52, the water tank 51, and the like, which are located at the top side thereof.

The beverage maker may further include a beverage container 101 configured to receive and keep beverage dropping from the beverage extraction valve 62. The beverage container 101 may be integrally formed with the base 100 or be coupled to the base 100.

The beverage container 101 may include a container body 101A having a space in which the beverage dropping from the beverage extraction valve 62 is accommodated. The beverage container 101 may include a container top plate 101B disposed at the top surface of the container body 101A to cover the space in the container body 101A.

The container body 101A may be formed to protrude forward at a front portion of the base 100. The top surface of the container body 101A may be opened.

Holes 101C through which the beverage drops into the container body 101A may be formed in the container top plate 101B.

Beverage dropping around a beverage container in the beverage dropping from the beverage extraction valve 62 may drop to the container top plate 101B, and be temporarily kept inside the beverage container 101 through the holes 101C of the container top plate 101B. Thus, surroundings of the beverage maker can be cleanly maintained.

The fermentation tank 112, as shown in FIG. 4, may include a lower fermentation tank 112A of which top surface is opened, the lower fermentation tank 112A having a space formed therein, and an upper fermentation tank 112B disposed at the top of the lower fermentation tank 112A, the upper fermentation tank 112B having the opening 111 formed in the top surface thereof.

A seat portion 116 on which the beverage ingredient pack 12 is mounted may be provided in the fermentation tank 112. The seat portion 116 may be provided to protrude from the opening 111, and a circumferential part of the beverage ingredient pack 12 may be mounted on the seat portion 116.

The beverage maker may include the heat insulating wall 102 surrounding both of the fermentation tank 112 and the evaporator 134.

The heat insulating wall 102 may be formed of polystyrene foam or the like, which has high heat insulation performance and can absorb vibration.

A heat insulating wall opening 103 may be formed at an upper portion of the heat insulating wall 102, and the heat insulating space S2 may be formed inside the heat insulating wall 102.

The heat insulating wall 102 may be configured as an assembly of a plurality of members. The heat insulating wall 102 may include a lower heat insulating wall 102A of which top surface is opened, the lower heat insulating wall 102A having a space formed therein, and an upper heat insulating wall 102B disposed at the top of the lower heat insulating wall 102A, the upper heat insulating wall 102B having the heat insulating wall opening 103 formed in the top surface thereof.

The heat insulating wall 102 having the lower heat insulating wall 102A and the upper heat insulating wall 102B may surround the circumferential and bottom surfaces of the fermentation tank 112.

The heat insulating wall opening 103 of the heat insulating wall 102 may surround an upper portion of the fermentation tank 112. The heat insulating wall opening 103 of the heat insulating wall 102 may surround the outer surface of a portion at which the heat insulating wall opening 103 is formed in the fermentation tank 112.

An inner surface 102C of the heat insulating wall 102 may have a larger diameter than an outer surface 112C of the fermentation tank 112, and a gap may be formed between the inner surface 102C of the heat insulating wall 102 and the outer surface 112C of the fermentation tank 112. Air may be filled in the gap, and the air between the inner surface 102C of the heat insulating wall 102 and the outer surface 112C of the fermentation tank 112 may heat-insulate the fermentation tank 112. The gap between the inner surface 102C of the heat insulating wall 102 and the outer surface 112C of the fermentation tank 112 may be a space in which the evaporator 134 is accommodated, and simultaneously be a space that can minimize a change in temperature of the fermentation tank 112.

The fermentation tank 112 may be mounted on a top surface 102E of a bottom plate part 102D of the heat insulating wall 102, and be supported by the top surface 102E of the bottom plate part 102D of the heat insulating wall 102.

A bottom surface 102F of the bottom plate part 102D of the heat insulating wall 102 may be placed on a heat insulating wall supporter 100A formed on the top surface of the base 100.

An air supply flow path through-hole 102G through which the air supply flow path 154 passes may be formed in the bottom plate part 102D of the heat insulating wall 102. The air supply flow path through-hole 102G may form at least part of a channel that is communicative with a space that is formed in the interior of the container body between a wall of the container body and the beverage ingredient pack 12 mounted inside the container body. Air that is supplied through this channel may exert pressure on the flexible beverage ingredient pack 12, causing the manufactured beverage to be extracted. At least a portion of the air supply flow path 154 may be formed through the heat insulating wall 102, and be connected to the fermentation tank 112.

Meanwhile, the evaporator 134 may be an evaporating tube wound around the outer surface of the fermentation tank 112 to be located in the gap. The evaporator 134 may be in contact with each of the outer surface 112C of the fermentation tank 112 and the inner surface 102C of the heat insulating wall 102. The evaporator 134 may be supported by the heat insulating wall 102.

The evaporator 134 may include an extending tube extending to the outside of the heat insulating wall 102 by passing through an evaporating tube through-hole formed in the heat insulating wall 102.

The beverage maker may include a heat insulating wall cover 104 and 105 surrounding the circumferential and top surfaces of the heat insulating wall 102.

The heat insulating wall cover 104 and 105 may be configured as one cover, and be configured as an assembly of a plurality of covers.

The heat insulating wall cover 104 and 105 may include a lower heat insulating wall cover 104 of which bottom surface is opened, the lower heat insulating wall cover 104 surrounding the outer circumferential surface of the heat insulating wall 102, and an upper heat insulating wall cover 105 disposed at the top of the lower heat insulating wall cover 104, the upper heat insulating wall cover 105 covering the top surface of the heat insulating wall 102.

A lower portion of the lower heat insulating wall cover 104 may be placed on the base 100.

A lower portion of the upper heat insulating wall cover 105 may be placed on the top end of the lower heat insulating wall cover 104.

The heat insulating wall cover 104 and 105 may protect the heat insulating wall 102, and form a portion of the appearance of the beverage maker.

The heat insulating wall cover 104 and 105 may surround the entire circumferential surface of the heat insulating wall 102, and surround only a portion of the circumferential surface of the heat insulating wall 102.

A side opening may be formed in a surface of the heat insulating wall cover 104 and 105, which faces the water tank 51. The extending tube of the evaporator 134 may be disposed to pass through the side opening. The extending tube of the evaporator 134 may extend to an accommodation space S5 shown in FIG. 4, which will be described later, by passing through the side opening of the heat insulating wall cover 104 and 105.

Meanwhile, the water tank 51 may be spaced apart from the base 100 at the top side of the base 100. The water tank may be spaced apart from the base 100 in the vertical direction. A space S3 in which at least one of the compressor 131, the water supply heater 53, and the water supply pump 52 is to be accommodated may be formed between the water tank 51 and the base 100. In addition, the water tank 51 may be spaced apart from the heat insulating wall 102 in the horizontal direction.

The beverage maker may include a water tank supporter 106 supporting the water tank 51 to be spaced apart from the base 100. The water tank supporter 106 may be disposed at the base 100, and support the water tank 51 to be spaced apart from the base 100 at the top side of the base 100. The bottom end of water tank supporter 106 may be placed on the base 100, and the water tank 51 may be placed at an upper portion of the water tank supporter 106.

The water tank supporter 106 may be configured such that a plurality of supporter members are entirely coupled in a hollow cylindrical shape. A side opening may be formed in a surface of the water tank supporter 106, which faces the heat insulating wall 102.

The water tank 51 may include an outer water tank 58, and an inner water tank 59 accommodated in the outer water tank 58, the inner water tank 59 in which a space S4 having water accommodated therein is formed.

The outer water tank 58 may be placed at an upper portion of the water tank supporter 106, and the bottom surface of the outer water tank 58 may be spaced apart from the top surface of the base 100. The space S3 in which at least one of the compressor 131, the water supply heater 53, and the water supply pump 52 is to be accommodated may be formed between the outer water tank 58 and the base 100.

The outer water tank 58 may have a vessel shape of which top surface is opened, and protect the inner water tank 59 by surrounding the outer circumferential and bottom surfaces of the inner water tank 59 located therein.

The inner water tank 59 may be inserted into the outer water tank 58, and be supported by the outer water tank 58.

The beverage maker may further include a water tank protector 107 disposed at the top side of the outer water tank 58 to surround an upper outer circumferential surface of the inner water tank 59. The water tank protector 107 may be disposed to surround the entire or a portion of the upper outer circumferential surface of the inner water tank 59. The water tank protector 107 may be configured such that a plurality of protector members are coupled in a ring shape.

The beverage maker may further include a water tank lid 108 coupled to the water tank 51 or the water tank protector 107 to cover the top surface of the water tank 51. One side of the water tank lid 108 may be rotatably connected to the water tank 51 or the water tank protector 107. The water tank lid 108 may be separably mounted on the top surface of the water tank 51 or the water tank protector 107.

Meanwhile, at least one of the compressor 131, the water supply heater 53, and the water supply pump 52 may be disposed between the base 100 and the water tank 51.

The condenser 132 may be disposed to face at least one of the space between the heat insulating wall 102 and the water tank 51, and the heat insulating wall 102.

The supplier 3 may be disposed between the fermentation tank cover 114 and the water tank 51. In this case, the beverage maker may be compactly manufactured as compared with when the supplier 3 is located at a position except the space between the fermentation tank cover 114 and the water tank 51, and the supplier 3 may be protected by the fermentation tank cover 114 and the water tank 51.

As shown in FIG. 4, one side of the supplier 3 may be mounted on the outer water tank 58, and the other side of the supplier 3 may be mounted on the heat insulating wall cover 104 and 105. The supplier 3 may be vertically spaced apart from the base 100 at the top side of the base 100.

The supplier 3 may include a capsule accommodation body 36 having the capsule accommodation part in which the capsules C1, C2, and C3 shown in FIG. 1 are attachably/detachably accommodated, and a lid module 37 covering the capsule accommodation part.

One side plate facing the water tank 51 among left and right side plates of the capsule accommodation body 36 may be mounted on a mounting part formed in the outer water tank 58 to be supported by the outer water tank 58.

The other side plate facing the fermentation tank cover 114 among the left and right side plates of the capsule accommodation body 36 may be mounted on the heat insulating wall cover 104 and 105, and be supported by the heat insulating wall cover 104 and 105.

The lid module 37 may include a lid 38 covering the capsule accommodation body 36. The lid 38 may be slidingly disposed at the capsule accommodation body 36 or be rotatably connected to the capsule accommodation body 36. The lid 38 may be hinge-connected to the capsule accommodation body 36.

The supplier 3 may be installed to be located at an approximately central upper portion of the beverage maker, and the user may easily mount or separate the capsules C1, C2, and C3 by upwardly rotating the lid module 37 of the supplier 3.

The accommodation space S5 in which a plurality of parts are to be accommodated may be formed in the beverage maker. Here, the accommodation space S5 may be a space that becomes a space between the heat insulating wall 102 and the water tank 51 in the left-right direction and becomes a space between the supplier 3 and the base 100 in the top-bottom direction.

In the beverage maker, a plurality of parts are preferably accommodated in the accommodation space S5. In this case, the beverage maker may become compact. The plurality of parts accommodated in the accommodation space S5 may be protected by being surrounded by the heat insulating wall 102, the water tank 51, the base 100, the supplier 3, the condenser 132, and a center cover 66 which will be described later.

The opening/closing valves 313, 323, and 333 installed in the supplier entrance flow paths 311, 321, and 331 shown in FIG. 1 to open/close the supplier entrance flow paths 311, 321, and 331, as shown in FIG. 4, may be located under the capsule accommodation body 36.

The opening/closing valves 313, 323, and 333 may be installed in a bracket 64 (see FIG. 3) disposed at the base 100.

The bracket 64 may be disposed to be located at a side of the heat insulating wall 102, and the opening/closing valves 313, 323, and 333 may be installed to be located between the heat insulating wall 102 and the water tank 51 by the bracket 64. The opening/closing valves 313, 323, and 333 may be located between the heat insulating wall 102 and the water tank 51 in the left-right direction, and be located between the base 100 and the supplier 3 in the top-bottom direction.

The beverage maker may further include the center cover 66 covering the front of the opening/closing valves 313, 323, and 333.

The center cover 66, as shown in FIG. 2, may be disposed to cover between the heat insulating wall cover 104 and the water tank supporter 106 in the left-right direction and cover between the supplier 3 and the base 100 in the top-bottom direction. The rear surface of the center cover 66 may face the condenser 132 in the front-rear direction, and protect a plurality of parts.

In addition, a front portion of the supplier 3 may be placed on the top end of the center cover 66, and the supplier 3 may be supported by the center cover 66.

Meanwhile, the beverage extraction valve 62 may be mounted to the center cover 66. The beverage extraction valve 62 may be mounted to protrude forward from the center cover 66. The beverage extraction valve 62 may be mounted to the center cover 66 to be located at the top side of the beverage container 101.

The beverage maker may include at least one processor, such as a controller 109, that controls various operations of the beverage maker.

As an example, the controller 109 may include a main PCB 109C.

The controller 109 may include a wireless communication element that performs wireless communication with a wireless communication device such as a remote controller or a portable terminal. The wireless communication element, such as a Wi-Fi module or a Bluetooth module, is not limited to its kind as long as it can perform wireless communication with a remote controller or a wireless communication device. The wireless communication element may be mounted on the main PCB 109C or a display PCB which will be described later.

The controller 109 may include an input unit that receives a command related to the manufacturing of the beverage maker. The input unit may include a rotary knob 109A and a rotary switch 109B switched by the rotary knob 109A. A knob hole 106A through which the rotary knob 109A rotatably passes may be formed at one side of the water tank supporter 106. The rotary knob 109A may be disposed such that at least one portion of the rotary knob 109A is exposed to the outside. The rotary switch 109B may be mounted on the main PCB 109C. The input unit may include a touch screen that receives a command of the user in a touch scheme. The touch screen may be provided in a display 109D which will be described later. The user may input a command through the remote controller or the wireless communication device, and the controller 109 may receive the command of the user through the wireless communication element.

The controller 109 may include the display 109D that displays various information of the beverage maker. The display 109D may include a display element such as LCD, LED, or OLED. The display 109D may include the display PCB on which the display element is mounted. The display PCB may be mounted on the main PCB 109C or be connected to the main PCB 109C through a separate connector.

The display 109D may display information input by the input unit.

The display 109D may display information of the beverage brewing pack 12 and information on a fermentation time of beverage ingredients, a beverage completion time, or the like.

The fermentation time of the beverage ingredients or the beverage completion time may be changed depending on kinds of the beverage ingredients contained in the beverage brewing pack 12. If beverage brewing pack 12 approaches the fermentation tank assembly 11, the controller 109 may acquire information from the beverage brewing pack 12 through a communication module such as NFC.

In some implementations, a compact chip 109E (see FIG. 5) in which various information related to the beverage ingredients may be attached in the shape of a sticker, etc. to the beverage brewing pack 12, and the chip 109E and an NFC tag 109F (see FIG. 5) that transmits/receives data may be installed in the beverage maker. In such implementations, the NFC tag 109F may be mounted on the fermentation tank assembly 11, the main PCB 109C, or the display PCB. When the NFC tag 109F is mounted on the fermentation tank assembly 11, the NFC tag 109F may be mounted on the opening 111 of the fermentation tank 112 or the fermentation tank cover 114. The NFC tag 109F may be connected to the controller 109 through a data line.

If the beverage brewing pack 12 is accommodated in the fermentation tank assembly 11, the controller 109 may acquire information of the beverage brewing pack 12 from a chip provided in the beverage brewing pack 12.

The controller 109 may transmit the information acquired from the NFC tag 109F to the display 109D or the wireless communication device, and the display 109D or the wireless communication device may display kinds of beverage ingredients, a total fermentation time, a beverage completion time, or the like.

The display 109D may display various information related to brewing of beverage while the beverage is being brewed. The controller 109 may be connected to the temperature sensor 16. The controller 109 may transmit information on a temperature sensed by the temperature sensor 16 to the display 109D or the wireless communication device, and the display 109D or the communication device may display the temperature sensed by the temperature sensor 16 through a numerical value, a graph, or the like.

The display 109D may display a completion degree of the beverage, an amount of carbonic acid contained in the beverage, or the like through a numerical value, a graph, or the like while the beverage is being brewed.

The display 109D may differently display a completion degree of the beverage in primary fermentation and a completion degree of the beverage in secondary fermentation. The amount of carbonic acid in the beverage of the beverage brewing pack 12 may be gradually increased as time elapses. The controller 109 may detect a pressure in the beverage brewing pack 12 through the pressure sensor 72, and detect a temperature of the fermentation tank assembly 11 through the temperature sensor 16. The controller 109 may calculate an amount of carbonic acid using the detected pressure and temperature according to a preset equation or table. The controller 109 may transmit information on the calculated amount of carbonic acid to the display 109D or the wireless communication device, and at least one of the display 109D and the wireless communication device may display the calculated amount of carbonic acid.

The display 109D may display a remaining amount of the beverage after the beverage is completely brewed.

If the secondary fermentation which will be described later is ended, the controller 109 may determine that the beverage has been completely brewed.

The controller 109 may add up at least one of a time at which a micro switch 630 which will be described later is on, a time at which the air pump 152 is driven, and a time at which the main valve 9 is on after the beverage is completely brewed. The controller 109 may calculate an extraction amount of the beverage according to the added-up time, and calculate a remaining amount of the beverage from the calculated extraction amount. The controller 109 may transmit information on the remaining amount of the beverage to the display 109D or the wireless communication device, and at least one of the display 109D and the wireless communication device may display the remaining amount of the beverage.

Figure 5:
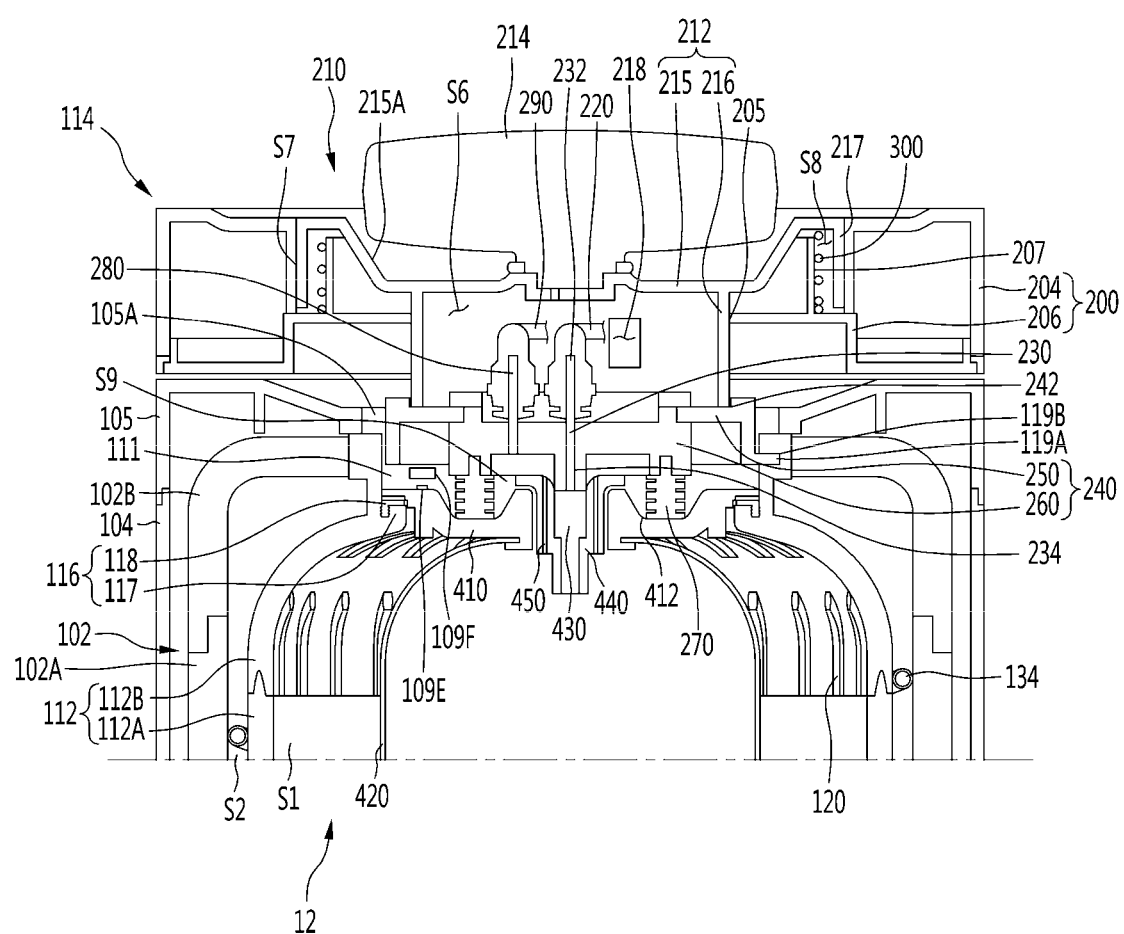
FIG. 5 is a diagram illustrating an example of a sectional view of an inside of a container, such as a fermentation tank assembly, of the beverage maker according to some implementations.
Figure 6:
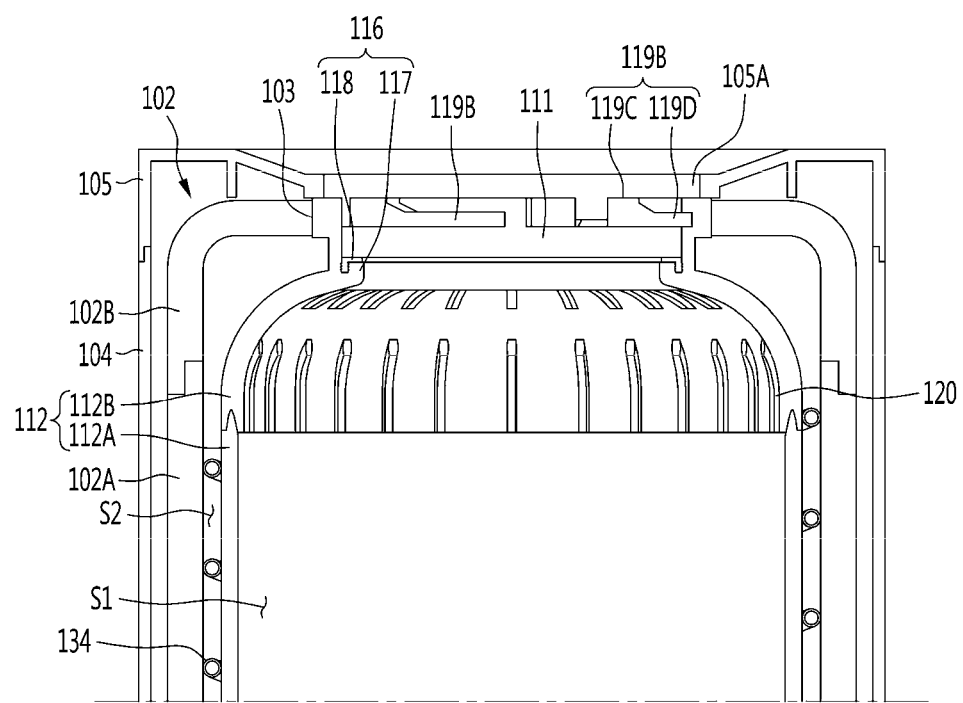
FIG. 6 is a diagram illustrating an example of a sectional view when an opening shown in FIG. 5 is opened.

FIG. 5 is a sectional view illustrating an example of an inside of the fermentation tank assembly of the beverage maker according to some implementations. FIG. 6 is a sectional view when the opening shown in FIG. 5 is opened.

An upper through-hole 105A disposed such that a portion of the fermentation tank cover 114 passes therethrough may be formed at an upper portion of the heat insulating wall cover 104 and 105. The upper through-hole 105A may be formed to be opened in the top-bottom direction in the upper heat insulating wall cover 105.

The fermentation tank 112 may include the seat portion 116 on which an upper portion of the beverage brewing pack 12 is mounted.

The seat portion 116 may include a sealing member supporting bump 117 protruding from the fermentation tank 112 and a fermentation tank sealing member 118 placed on the sealing member supporting bump 117.

The sealing member supporting bump 117 may protrude in a ring shape in the opening 111.

The fermentation tank sealing member 118 may be placed on the top surface of the sealing member supporting bump 117.

A circumferential portion of the beverage brewing pack 12 may be placed on the top surface of the fermentation tank sealing member 118, and the inside of the fermentation tank 112 may be sealed by the beverage brewing pack 12 and the fermentation tank sealing member 118.

An inserting guide 119B into an inserting projection 119A formed at the fermentation tank cover 114 is rotatably inserted may be formed in the opening 111 of the fermentation tank 112. The inserting guide 119B may be formed at a portion of the opening 111 of the fermentation tank 112. The inserting guide 119B may include a vertical guide groove 119C through which the inserting projection 119A passes approximately in the top-bottom direction, and a horizontal guide groove 119D formed long in the circumferential direction along the opening 111 at a lower portion of the vertical guide groove 119C to guide movement of the inserting projection 119A.

The inserting projection 119A may be protrude in the horizontal direction at a position capable of facing the opening 111 of the fermentation tank 112 when the fermentation tank cover 114 is closed.

The inserting guide 119B may be formed in a recessed shape at a higher position than the sealing member supporting bump 117.

A plurality of ribs 120 that allow a flexible container 420 of the beverage ingredient pack 12, which will be described later, to be spaced apart from the inner surface of the fermentation tank 112 may protrude from the inner wall of the fermentation tank 112. As ingredients are fermented, gas may be generated in the beverage ingredient pack 12, and the flexible container 420 may be expanded by the gas in the beverage ingredient pack 12. In the beverage maker, when a beverage product is extracted, air supplied from the beverage extraction pressurizing device 15 shown in FIG. 6 may be introduced between the flexible container 420 and the inner surface of the fermentation tank 112, and the plurality of ribs 120 formed on the inner wall of the fermentation tank 112 may assist smooth flow of the air supplied to the inside of the fermentation tank 112 from the beverage extraction pressurizing device 15.

The plurality of ribs 120 may be formed long in the top-bottom direction. The plurality of ribs 120 may be spaced apart from one another in the circumferential direction of the fermentation tank 112 along the inner surface of the fermentation tank 112.

The plurality of ribs 120, referring to FIG. 4, may be formed at each of upper and lower portions of the inner wall of the fermentation tank 112.

In some implementations, the beverage maker 1 may include at least two channels that connect to the beverage ingredient pack (e.g., beverage brewing pack 12) mounted inside the fermentation tank assembly 11. These channels may supply or extract liquids or gases to or from the beverage ingredient pack 12. For example, as shown in the example of FIG. 5, one such channel may include at least the main tube 220 and/or the main flow path part 230. This channel may connect to the inner hollow part 430 of the beverage ingredient pack 12. Another such channel, also shown in the example of FIG. 5, may include at least the sub-tube 290 and/or the sub-flow path part 280. This channel may connect to the gas discharge flow path 450 of beverage ingredient pack 12. In the example of FIG. 5, both of these channels are formed through the fermentation tank cover 114, although implementations are not limited thereto.

Hereinafter, an example of the fermentation tank cover 114 in FIG. 5 will be described in more detail.

The fermentation tank cover 114 may include an outer body 200, an inner body 210 rotatably disposed at the outer body 200, and a lower body assembly 240 coupled to a lower portion of the inner body 210. The lower body assembly 240 may include a main flow path part 230 to which the main tube 220 is connected. An inner space S6 may be formed in at least one of the inner body 210 and the lower body assembly 240. In addition, at least one portion of the main tube 220 may be accommodated in the inner space S6. The main tube 220 may be connected to the main flow path part 230 in the inner space S6 of the main tube 220.

The lower body assembly 240 may include a lower body 250 coupled to the inner body 210, and a flow path body 260 in which the main flow path part 230 is formed.

The outer body 200 may form an appearance of the circumferential surface of the fermentation tank cover 114. The fermentation tank cover 114 may be hinge-connected to the fermentation tank 112 or the heat insulating wall cover 105. In this case, the outer body 200 may be hinge-connected to the fermentation tank 112 or the heat insulating wall cover 105. The outer body 200 may be mounted on the top surface of the heat insulating cover 105. The outer body 200 is preferably connected to the heat insulating wall cover 105 by a hinge.

An inner body accommodation space S7 in which the inner body 210 can be rotatably accommodated may be formed in the outer body 200.

The outer body 200 may surround the outer circumference of the inner body 210 accommodated in the inner body accommodation space S7, and protect the outer circumference of the inner body 210.

The inner body 210 may be disposed in the inner body accommodation space S7 to rotate about a vertical center axis.

The inner body 210 may include an inner frame 212 rotatably disposed in the outer body 200, the inner frame 212 having the inner space S6 formed at a lower portion thereof.

The inner body 210 may include a handle 214 disposed at the top surface of the inner frame 212. The user may rotate the inner body 210 about the vertical center axis of the inner body 210 while grasping the handle 214. When the inner body 210 is rotated, the lower body assembly 240 may be rotated together with the inner body 210.

The inner frame 212 may include an inner upper body part 215, an inner lower body part 216 protruding from the bottom surface of the inner upper body part 215, the inner lower body part 216 having the inner space S6 formed therein, and an outer hollow part 217 protruding at the outer circumference of the inner upper body part 215, the outer hollow part 217 being spaced apart from the inner lower body part 216.

A tube through-hole 218 through which the main tube 220 and a sub-tube 290 which will be described later pass may be formed in the inner frame 212. The tube through-hole 218 may be a hole through which the main tube 220 and the sub-tube 290, extending to the outside from the inner space S6, pass. The tube through-hole 218 is preferably formed at one side of the inner lower body part 216.

The inner upper body part 215 may include a handle accommodation groove part 215A in which at least one portion of the handle 214 is accommodated. The handle accommodation groove part 215A may be formed in a downwardly recessed shape, and be formed larger than the handle 214.

The inner lower body part 216 may protrude in a hollow cylindrical shape from the bottom surface of the inner upper body part 215. The inner space S6 may be formed in the inner lower body part 216 such that the bottom surface of the inner space S6 is opened.

The outer hollow part 217 may be formed to protrude in the lower direction at the outer circumference of the inner upper body part 215. The outer hollow part 217 may be configured as a hollow cylindrical part formed larger than the inner lower body part 216. The outer hollow part 217 may be in surface contact with the inner circumferential surface of the outer body 200, and be supported by the outer body 200.

Meanwhile, the outer body 200 may include an outer frame 204 and an outer base 206 coupled to the outer frame 204, the outer base 206 including an inner body through-hole 205 through which the inner body 210 passes.

The outer body 200 may include an inner hollow part 207 having a smaller size than the outer hollow part 217, the inner hollow part 207 facing the outer hollow part 217. A return spring accommodation space S8 in which a return spring 300 which will be described later is accommodated may be formed between the inner hollow part 207 and the outer hollow part 217.

The inner hollow part 207 may protrude from the top surface of the outer base 206. The inner hollow part 207 may be formed to have a smaller size than the outer hollow part 217 of the inner body 210.

The main tube 220 and the main flow path part 230 may constitute the main flow path connecting part 115 shown in FIG. 1. The main tube 220 may constitute a portion of the main flow path 2 shown in FIG. 1, and the main flow path part 230 may constitute the main flow path connecting part 115 shown in FIG. 2.

The main tube 220 may extend to the outside of the fermentation tank cover 114 through the tube through-hole 218 formed in the fermentation tank cover 114.

The main flow path part 230 may include an upper flow path part 232 protruding to the inner space S6 at an upper portion of the flow path body 260, and a lower flow path part 234 protruding toward the space S1 of the fermentation tank 112 at a lower portion of the flow path body 260.

A lower portion of the main flow path part 230 may be in contact with a pack main flow path formed in the beverage brewing pack 12, which will be described later. The main flow path part 230 may communicate with the pack main flow path of the beverage brewing pack 12.

The lower body assembly 240 may be coupled to the inner frame 212 to seal the inner space S6.

An inner frame insertion groove part 242 into which a bottom end of the inner frame 212 is inserted may be formed in the lower body assembly 240.

The lower body 250 may be coupled to a lower portion of the inner body 210, and at least one portion of the lower body 250 may be inserted into the opening 111.

The inserting projection 119A sliding along the inserting guide 119B formed in the opening 111 of the fermentation tank 112 may be formed at the outer circumferential surface of the lower body 250.

The flow path body 260 may be installed at the lower body 250.

The fermentation tank cover 114 may include a lower sealing member 270 mounted to at least one of the lower body 250 and the flow path body 260, the lower sealing member 270 being adhered closely to the beverage brewing pack 12.

A communication path S9 that guides gas extracted from the beverage brewing pack 12 to a sub-flow path part 280 which will be described later may be formed in the lower sealing member 270. The lower sealing member 270 may be a hollow elastic member having the communication path S9 formed therein.

A portion of the main flow path part 230 may protrude to the communication path S9, and the lower sealing member 270 may protect the main flow path part 230.

Meanwhile, the sub-flow path part 280 communicating with the communication path S9 may be formed in the vicinity of the main flow path part 230.

The sub-flow path part 280 may be formed in the flow path body 260.

The sub-tube 290 that guides gas passing through the sub-flow path part 280 may be connected to the sub-flow path part 280. At least one portion of the sub-tube 290 may be accommodated in the inner space S6. The sub-tube 290 may extend to the outside of the fermentation tank cover 114 through the tube through-hole 218 formed in the fermentation tank cover 114.

The gas extraction flow path 71 shown in FIG. 1 may be connected to the sub-tube 290, and the sub-tube 290 may constitute a portion of the gas extraction flow path 71 shown in FIG. 1.

The pressure sensor 72 shown in FIG. 1 may sense a pressure of the gas passing through the sub-tube 290.

When the gas extraction valve 73 shown in FIG. 1 is opened, gas in the beverage brewing pack 12 may sequentially pass through a gas discharge flow path 450 formed in the beverage brewing pack 12, the communication path S9 of the lower sealing member 270, the sub-flow path part 280, and the sub-tube 290 and then flow in the pressure sensor 72. The pressure sensor 72 may sense a pressure of the gas in the beverage brewing pack 12 in a state in which the fermentation tank cover 114 is not opened.

The fermentation tank cover 114 may further include the return spring 300 connected to the outer body 200 and the inner body 210. One end of the return spring 300 may be connected to the outer body 200, and the other end of the return spring 300 may be connected to the inner body 210. The return spring 300 may be configured as a coil spring. When the user holds and turns the handle 214 of the inner body 210, the return spring 300 may be elastically deformed, and a return force that rotates the inner body 210 in the opposite direction may be applied to the inner body 210.

Figure 7:
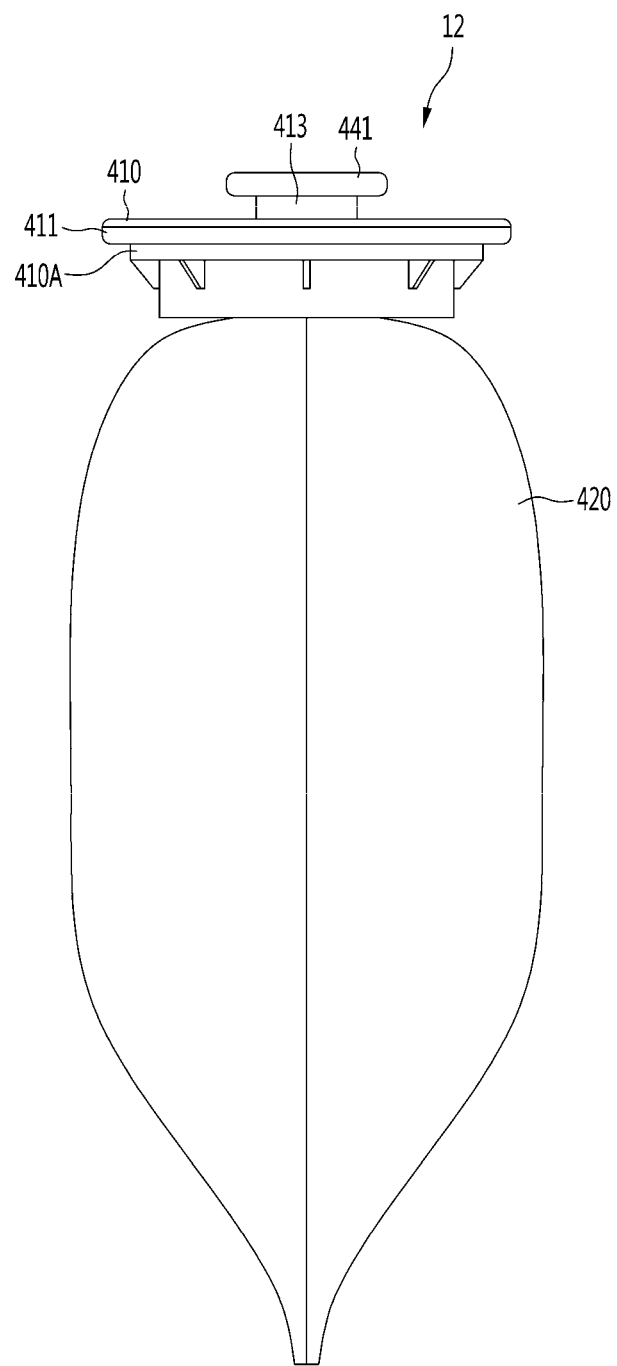
FIG. 7 is a diagram illustrating a side view of an example of a beverage ingredient pack of the beverage maker according to some implementations.

Meanwhile, as shown in FIGS. 5 and 7, the beverage ingredient pack 12 may include an interface portion 410 that provides an interface with the fermentation tank cover 114 in a state in which the fermentation tank cover 114 is closed.

In addition to the interface portion 410, the beverage ingredient pack 12 may include the flexible container 420 connected to the interface portion 410, the flexible container 420 accommodating beverage ingredients therein, a main flow path body 440 provided in the interface portion 410, the main flow path body 440 having an inner hollow part 430 formed therein. The gas discharge flow path 450 through which the gas in the beverage ingredient pack 12 is discharged may be formed in the beverage ingredient pack 12.

A sealing member mounting groove part 412 on which a lower portion of the lower sealing member 270 is inserted and mounted may be formed at the top surface of the interface portion 410. The sealing member mounting groove part 412 may be formed in a shape recessed downward from the top surface of the interface portion 410. The sealing member mounting groove part 412 may be formed in a ring shape at the top surface of the interface portion 410. The bottom end of the lower sealing member 270 as a hollow elastic member may be placed on the sealing member mounting groove part 412.

When the beverage ingredient pack 12 is inserted into the fermentation tank 112 to be mounted on the seat portion 116, the inner hollow part 430 of the beverage ingredient pack 12 and the gas discharge flow path 450 of the beverage ingredient pack 12 may face upward. The inner hollow part 430 of the beverage ingredient pack 12 and the gas discharge flow path 450 of the beverage ingredient pack 12 may be exposed to the inside of the opening 111 of the fermentation tank 112.

The fermentation tank cover 114 may fall down to cover the opening 111 of the fermentation tank 112 after the beverage ingredient pack 12 is mounted in the fermentation tank 112. When the inner body 210 is rotatably inserted into the opening 111 by a manipulation of the handle 214, the lower sealing member 270 of the fermentation tank cover 114 may be mounted on the sealing member mounting groove part 412. The lower sealing member 270 of the fermentation tank cover 114 may surround the upper outer circumference of the main flow path body 440.

When the fermentation tank cover 114 is closed and inserted into the fermentation tank 112 while covering the opening 111 of the fermentation tank 112 as described above, a lower portion of the main flow path part 230 of the flow path body 260 may communicate with the inner hollow part 430 of the beverage ingredient pack 12. In addition, when the fermentation tank cover 114 is closed, the gas discharge flow path 450 of the beverage ingredient pack 12, the communication path S9 of the lower sealing member 270, and the sub-flow path part 280 of the flow path body 260 may sequentially communicate with each other.

As such, in a state in which the fermentation tank cover 114 closes the opening 111 of the fermentation tank 112, the a supply path along which the main tube 220, the main flow path part 230 of the flow path body 260 and the inner hollow part 430 of the beverage ingredient pack 12 are sequentially continued may be formed in the fermentation tank assembly 11. In addition, a beverage extraction path along which the inner hollow part 430 of the beverage ingredient pack 12, the main flow path part 230 of the flow path body 260, and the main tube 220 are sequentially continued may be formed in the fermentation tank assembly 11. In addition, a gas discharge path along which the gas discharge flow path 450 of the beverage ingredient pack 12, the communication path S9 of the lower sealing member 270, the sub-flow path part 280 of the flow path body 260, and the sub-tube 290 are sequentially continued may be formed in the fermentation tank assembly 11.

In a beverage maker, the supply of ingredient, the extraction of beverage, and the calculation of a fermentation degree of the beverage can be performed in a state in which the fermentation tank cover 114 is not opened but closed.

Figure 8:
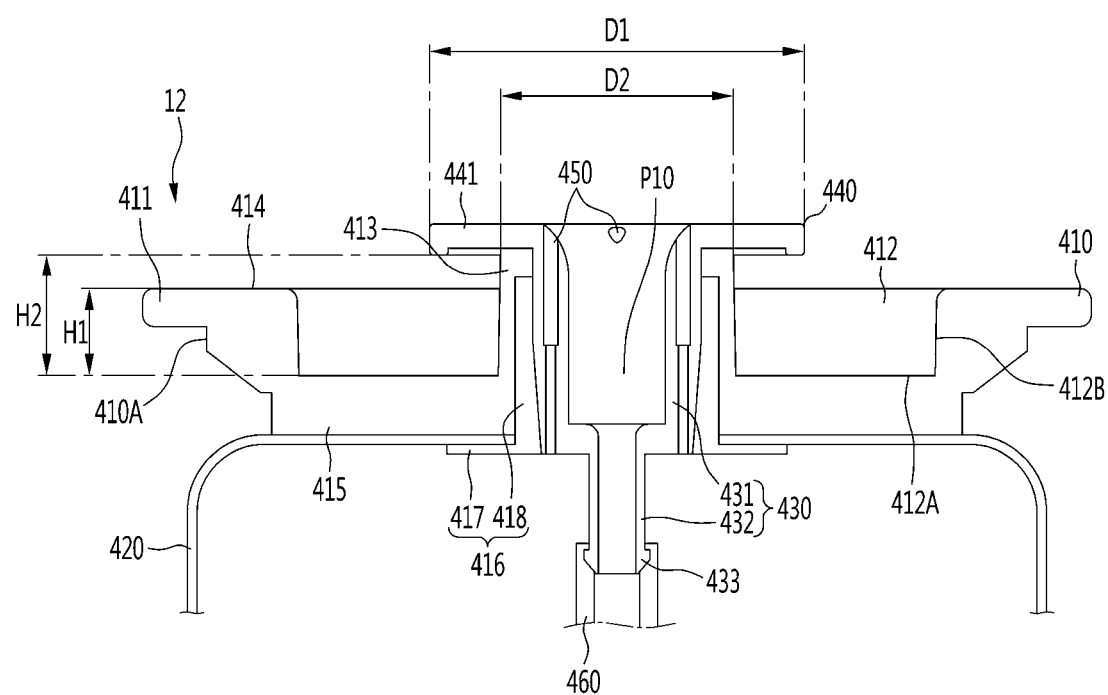
FIG. 8 is a diagram illustrating a sectional view of the example of the beverage ingredient pack of the beverage maker according to some implementations.

FIG. 7 is a side view illustrating an example of the beverage ingredient pack of the beverage maker according to some implementations. FIG. 8 is a sectional view illustrating the example of the beverage ingredient pack of the beverage maker according to some implementations.

The beverage ingredient pack 12 may include an interface portion 410 including a mounting part 411 mounted in the fermentation tank assembly 11 shown in FIGS. 5 and 6, the interface portion 410 having an outer hollow part 413 protruding therefrom; the flexible container 420 coupled to the interface portion 410; the main flow path body 440 including the inner hollow part 430 inserted and accommodated in the outer hollow part 413, and the main flow path body 440 having a handle part 441 located at the top of the outer hollow part 413; and a tubular portion, such as flexible tube 460, connected to the inner hollow part 430, the flexible tube 460 protruding to the inside of the flexible container 420. In some implementations, the flexible tube 460 may be part of the interface portion 410.

The external diameter of the interface portion 410 may be smaller than the internal diameter of the opening 111 of the fermentation tank 112 shown in FIGS. 5 and 6, and be greater than the internal diameter of the seat portion 116 shown in FIGS. 5 and 6.

The mounting part 411 may be placed and mounted on the seat portion 116 shown in FIG. 6. The mounting part 411 may be a part protruding to have a thinner thickness than the other part along an outer circumference 410A of the interface portion 410. The mounting part 411 may protrude in the radial direction from the interface portion 410. The mounting part 411 may be formed in a ring shape along the outer circumference 410A of the interface portion 410.

The beverage ingredient pack 12, as shown in FIG. 5, may be easily mounted in the fermentation tank 112 through a simple operation of inserting the flexible container 420 into the space S1 of the fermentation tank 112 and placing the mounting part 411 on the seat portion 116 shown in FIG. 5.

A recessed part may be formed at the top surface of the interface portion 410. The recessed part formed at the top surface of the interface portion 410 may be concavely recessed at the top surface of the interface portion 410 such that a portion of a finger of the user is easily inserted thereinto.

The recessed part formed at the top surface of the interface portion 410 may be the sealing member mounting groove part 412 shown in FIG. 5. The recessed part may assist the user to easily grasp the handle part 441 of the main flow path body 440 when the beverage ingredient pack 12 is carried. When the beverage ingredient pack 12 is mounted in the fermentation tank 112 as shown in FIG. 5, the recessed part may be in contact with the lower sealing member 270 of the fermentation tank cover 114. Hereinafter, for convenience, the recessed part will be described using the same reference numeral as the sealing member mounting groove part.

The outer hollow part 413 may protrude in the upper direction at the center of the interface portion 410.

The outer hollow part 413 may protrude in the upper direction from a bottom surface 412A of the recessed part 412. The outer hollow part 413 may protrude higher than a height H1 of the recessed part 412. A height H2 of the outer hollow part 413 may be higher than the height H1 of the recessed part 412. The outer hollow part 413 may support the handle part 441 of the main flow path body 440 such that the handle part 441 is located higher than a top surface 414 of the interface portion 410.

The flexible container 420 may be joined with the interface portion 410 to be integrated with the interface portion 410. A portion of the flexible container 420 may be inserted into the interface portion 410.

The interface portion 410 may be configured by joining a plurality of members, and the flexible container 420 may be fixed to the interface portion 410 by joining a plurality of members in a state in which portions of the flexible container 420 is inserted between the plurality of members.

The interface portion 410 may include a main body 415 having the mounting part 411 and the outer hollow part 413, formed therein, and a joining body 416 joined with the main body 415, the joining body 416 being joined with the flexible container 420.

The joining body 416 may include a joining part 417 joined with the flexible container 420, the joining part 417 disposed under the main body 415, and a center hollow part 418 inserted into the outer hollow part 413 at the joining part 417, the center hollow part 413 joined with the main body 415.

The top surface of the joining part 417 may face the bottom surface of the main body 415. The joining part 417 may include a ring-shaped plate body in which the flexible container 420 is joined with the top surface thereof.

When the inner hollow part 430 of the main flow path body 440 is inserted into the outer hollow part 413, the center hollow part 418 may be located between the inner circumferential surface of the outer hollow part 413 and the outer circumferential surface of the inner hollow part 430.

The inner hollow part 430 may include an upper hollow part 431 disposed in the outer hollow part 413, and a tube connecting part 432 protruding at a lower portion of the upper hollow part 431, the tube connecting part 432 having a smaller diameter than the upper hollow part 431, the tube connecting part 432 being connected to the flexible tube 460.

The inner hollow part 430 may be separably inserted into the interface portion 410. When the inner hollow part 430 is inserted into the interface portion 410, the inner hollow part 430 may be inserted into the interface portion 410 to be in surface contact with the outer body 200 and the center hollow part 418. The inner hollow part 430 may be inserted into the interface portion 410 to be capable of being escaped from the interface portion 410 when the user strongly pulls the handle part 441 in the upper direction.

The main flow path body 440 may be separated from the interface portion 410. When a pack main flow path P10 is blocked or when the flexible tube 460 is not normally spread or bent, the main flow path body 440 may be separated from the interface portion 410. The user may take an action of replacing the main flow path body 440 or the flexible tube 460.

The pack main flow path P10 may be formed in the inner hollow part 430. The pack main flow path P10 may be formed long in the top-bottom direction in the inner hollow part 430.

The pack main flow path P10 may be formed at the upper hollow part 431 and the tube connecting part 432. The pack main flow path P10 may be formed long in the top-bottom direction from the top end of the upper hollow part 431 to the bottom end of the tube connecting part 432. The pack main flow path P10 may be formed such that an area of the upper hollow part 431 is wider than that of the tube connecting part 432.

At least one gas discharge flow path 450 may be formed in the vicinity of the pack main flow path P10 in the upper hollow part 431. A plurality of gas discharge flow paths 450 may be formed in parallel to the pack main flow path P10 between the pack main flow path P10 and the outer circumferential surface of the upper hollow part 431.

The tube connecting part 432 may include a flexible tube attaching/detaching part 433 to/from which the flexible tube 460 is attached/detached.

The handle part 441 of the main flow path body 440 may be formed to protrude at an upper portion of the inner hollow part 430. The handle part 441 may be formed in a hollow disk shape at the upper portion of the inner hollow part 430. The user may carry the beverage ingredient pack 12 while grasping the mounting part 411 or the handle part 441. An outer diameter D1 of the handle part 441 may be greater than that D2 of the outer hollow part 413. The bottom surface of the handle part 441 may be placed on the top end of the outer hollow part 413. The handle part 412 has a smaller size than the recessed part 412. The handle part 441 may be spaced apart from the top surface 414 of the interface portion 410 and a circumferential surface 412B of the recessed part 412.

The user may grasp the handle part 441 of the main flow path body 440 while putting a finger of the user in the recessed part 412, and carry the beverage ingredient pack 12 to the upper side of the fermentation tank 112 shown in FIG. 6. The user may insert the flexible container 420 into the space S1 of the fermentation tank 112, and place the mounting part 411 on the seat portion 116 as shown in FIG. 5. Thus, beverage ingredient pack 12 can be simply mounted in the fermentation tank 112.

Meanwhile, when the user extracts the beverage ingredient pack 12 from the fermentation tank 112, the user may grasp the handle part 441 of the main flow path body 440 with a hand of the user by putting a hand of the user in the opening of the fermentation tank 112, and upwardly lift the beverage ingredient pack 12. The beverage ingredient pack 12 may be escaped to the upper side of the opening 111 of the fermentation tank 112. Thus, the beverage ingredient pack 12 can be easily extracted from the fermentation tank 112.

The flexible tube 460 may guide water or air guided to the pack main flow path P10 to a deep position in the flexible container 420, and beverage contained at a lower portion of the flexible container 420 may easily flow in the pack main flow path P10 through the flexible tube 460.

The flexible tube 460 may be roundly curved or bent at least once in the flexible container 420. The flexible tube 460 may be curved or bent before the beverage ingredient pack 12 is inserted into the fermentation tank 112. When air or hot water is supplied to the pack main flow path P10, the flexible tube 460 may be spread long in the length direction by the air or hot water.

When the flexible container 420 is maximally expanded, the flexible tube 460 may have a length where the bottom end of the flexible tube 460 is spaced apart from the inner bottom end of the flexible container 420.

The bottom end of the flexible tube 460 may be sharply formed, and have a shape of which portion is opened in the circumferential direction thereof.

The flexible tube 460 may have a lower hardness than the main flow path body 440. The flexible tube 460 is preferably connected to the tube connecting part 432 of the main flow path body 440 after the flexible tube 460 is manufactured separately from the main flow path body 440.

The flexible tube 460 is not connected to the main flow path body 440, but a hollow part through which a fluid can pass may integrally protrude long at a lower portion of the main flow path body 440. However, in this case, the compactness of the beverage ingredient pack 12 may not be easily performed, or it may be inconvenience for the user to grasp the handle part 441 with a hand of the user, depending on the hardness of the main flow path body 440. More specifically, the hardness of the entire main flow path body 440 may be formed low such that the hollow part can be curved or bent. In this case, when the user grasps the handle part 441 of a hand of a user, the handle part 441 may also be curved or bent by the hand of the user. In addition, it may not be easy for the user to grasp the handle part 441 with the hand of the user.

On the contrary, the hardness of the entire main flow path body 440 including the hollow part may be formed high such that the hardness of the handle part 441 increases. In this case, the main flow path body 440 may have a structure in which the hollow part is not curved or bent, and the compactness of the beverage ingredient pack 12 may not be easily performed.

That is, the flexible tube 460 is preferably connected to the main flow path body 440 after the main flow path body 440 and the flexible tube 460 are manufactured separately from each other. The user can easily grasp the handle part having a high hardness with a hand of the user, and the flexible tube 460 having a relatively low hardness can assist the compactness of the beverage ingredient pack 12 as the hollow part is curved or bent in the flexible tube 460.

Figure 9:
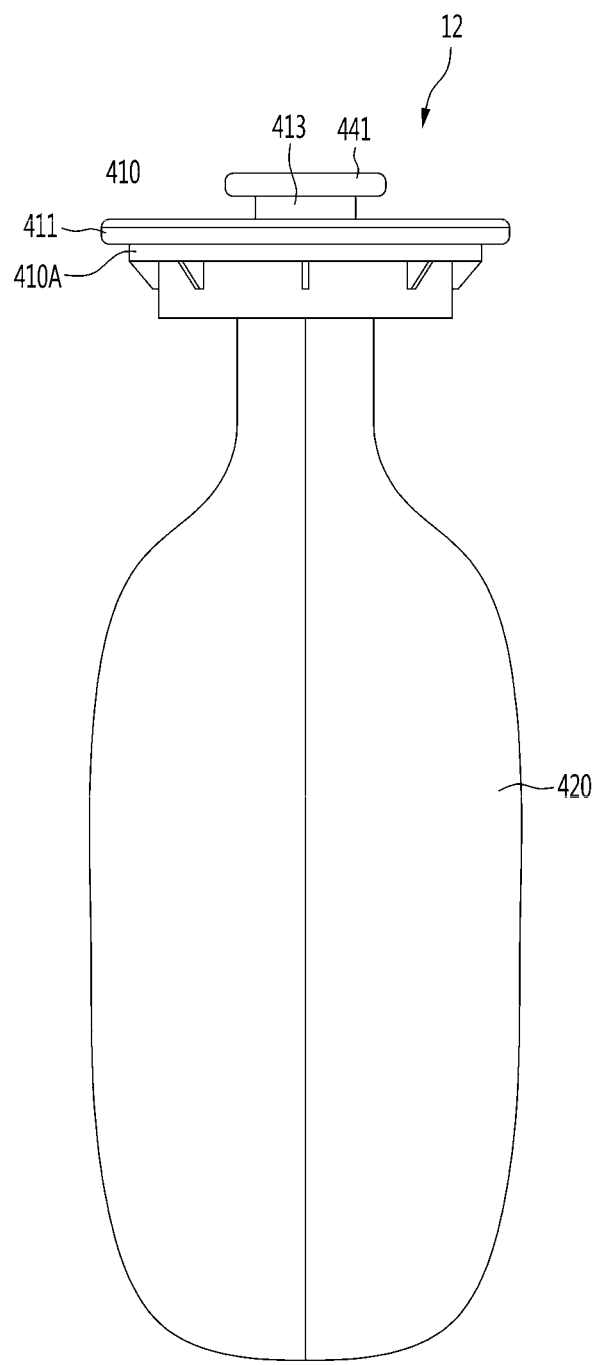
FIG. 9 is a diagram illustrating a side view of another example of the beverage ingredient pack of the beverage maker according to some implementations.
Figure 10:
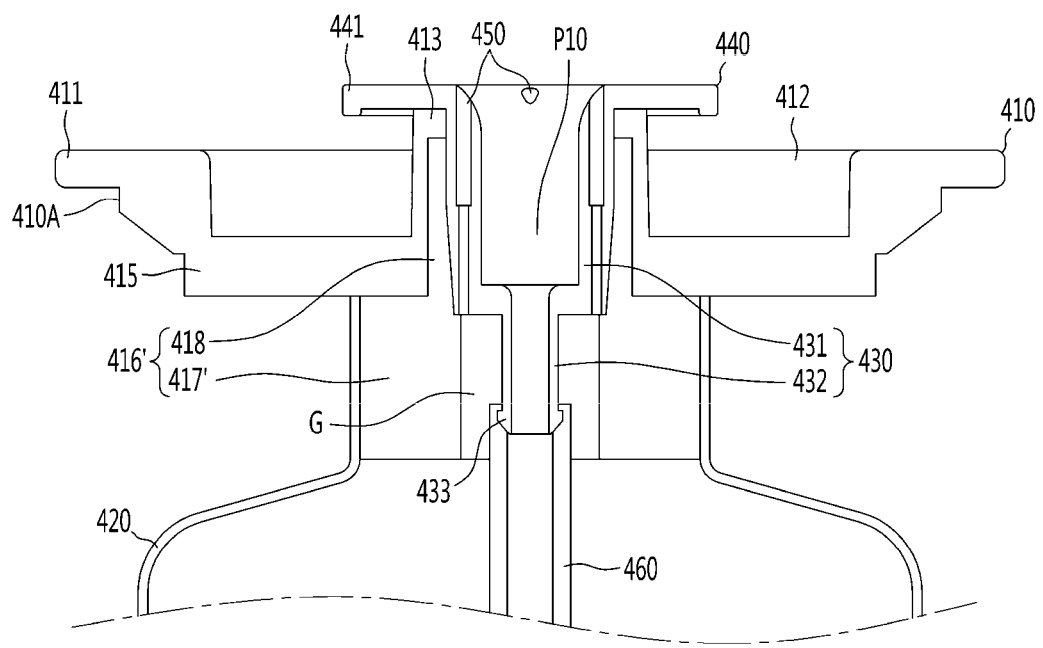
FIG. 10 is a diagram illustrating a sectional view of the another example of the beverage ingredient pack of the beverage maker according to some implementations.

FIG. 9 is a side view illustrating another example of the beverage ingredient pack of the beverage maker according to some implementations. FIG. 10 is a sectional view illustrating the another example of the beverage ingredient pack of the beverage maker according to some implementations.

In the beverage ingredient pack 12 shown in FIGS. 9 and 10, a joining position of the flexible container 420 may be different from that in the example of the beverage ingredient pack shown in FIGS. 7 and 8, and a configuration of a joining body 416' may be different from that in the beverage ingredient pack shown in FIGS. 7 and 8.

The joining body 416' of the beverage ingredient pack shown in FIGS. 9 and 10 may include a joining part 417' disposed on the bottom surface of the main body 415, and the joining part 417' having the flexible container 420 joined therewith, and the center hollow part inserted into the outer hollow part 413 at the joining part 417'. The joining part 417' may include a hollow body of which top surface faces the bottom surface of the main body 415, the hollow body having the flexible container 420 is joined with the circumferential surface thereof.

In the beverage ingredient pack shown in FIGS. 9 and 10, the other components except the joining body 416' are identical or similar to those in the example of the beverage ingredient pack shown in FIGS. 7 and 8. Therefore, like reference numerals are used for like components, and their descriptions are omitted.

The joining part 417' shown in FIGS. 9 and 10 may has a higher height than the tube connecting part 432, and surround the outer circumference of the tube connecting part 432. A gap G into which the flexible tube 460 is inserted may be formed between the outer circumferential surface of the joining part 417' and the tube connecting part 432.

The flexible tube 460 may be inserted into the joining part 417' to be connected to the tube connecting part 432.

The joining part 417' shown in FIGS. 9 and 10 may protect a connecting part between the tube connecting part 432 and the flexible tube 460 and the outer circumference of the tube connecting part 432 by surrounding the connecting part between the tube connecting part 432 and the flexible tube 460 and the outer circumference of the tube connecting part 432. Thus, damage of the tube connecting part 432 can be minimized.

Figure 11:
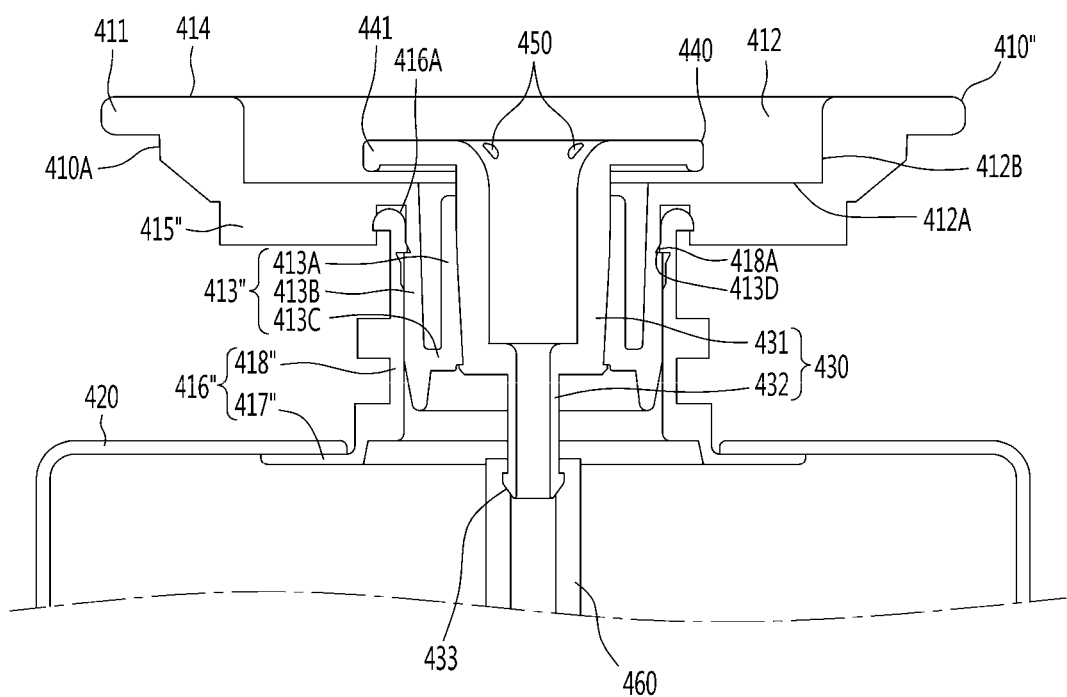
FIG. 11 is a diagram illustrating a sectional view of still another example of the beverage ingredient pack of the beverage maker according to some implementations.

FIG. 11 is a sectional view illustrating still another example of the beverage ingredient pack of the beverage maker according to some implementations.

In the beverage ingredient pack shown in FIG. 11, a protruding direction of an outer hollow part 413" and a detailed shape of the outer hollow part 413" may be different from those in the outer hollow part 413 of the interface portion 410 shown in FIGS. 9 and 10. In addition, an interface portion 410" may include a main body 415" and a connecting body 416", which are different from those of the interface portion 410 shown in FIGS. 9 and 10.

In the beverage ingredient pack of this implementation, configurations and operations of the flexible container, the main flow path body 440, and the flexible tube 460 except the interface portion 410" are identical to those in the beverage ingredient pack shown in FIGS. 9 and 10. Therefore, like reference numerals are used for like components, and their descriptions are omitted.

The interface portion 410" may include the mounting part 411, the recessed part 412, and the outer hollow part 413", and the mounting part 411 and the recessed part 412 are identical to those in the beverage ingredient pack shown in FIGS. 9 and 10. Therefore, like reference numerals are used for like components, and their descriptions are omitted.

The outer hollow part 413" may protrude in the lower direction at the center of the interface portion 410". The outer hollow part 413" may protrude in the lower direction under the recessed part 412.

The outer hollow part 413" may support the main flow path body 440 such that the handle part 441 of the main flow path body 440 is located higher than the bottom surface 412A of the recessed part 412 as the handle part 441 is located lower than the top surface 414 of the interface portion 410".

The outer hollow part 413" may be formed to be elastically deformed. The outer hollow part 413" may include a first hollow part 413A into which the inner hollow part 430 of the main flow path body 440 is inserted, a second hollow part 413B formed larger than the first hollow part 413A, the second hollow part 413B surrounding the outer circumference of the first hollow part 413A, and a connecting part 413C connecting the first hollow part 413A and the second hollow part 413B.

If necessary, the first hollow part 413A may be elastically deformed in a state in which the first hollow part 413A is connected to the second hollow part 413B through the connecting part 413C.

The interface portion 410" may include the main body 415" in which the mounting part 411 and the outer hollow part 413" are formed, and the connecting body 416" connected to the main body 415" and the flexible container 420.

The connecting body 416" may include a lower hollow part 418" surrounding the outer circumference of the outer hollow part 413".

The lower hollow part 418" may be formed in a hollow cylindrical shape. The lower hollow part 418" may be attached/detached to/from the main body 415".

A lower hollow part inserting groove part 416A into which an upper portion of the lower hollow part 418" is inserted may be formed in the main body 415". The lower hollow part inserting groove part 416A may be formed to be recessed in the vicinity of the outer hollow part 413" of the main body 415".

The connecting body 416" may be separably connected to the main body 415".

A holding bump 413D may protrude from the outer surface of the outer hollow part 413", and a holding projection 418A mounted on the holding bump 413D to be held by the holding bump 413D may be formed at the inner circumferential surface of the lower hollow part 418".

When an upper portion of the connecting body 416" is inserted into the lower hollow part inserting groove part 416A, the holding projection 418A may be placed on the holding bump 413D to be held by the holding bump 413D. If an external force is not applied to the connecting body 416", a state in which the connecting body 416" is coupled to the main body 415" may be maintained.

The connecting body 416" may further include a joining part 417" protruding at a lower portion of the lower hollow part 418", the joining part 417" having the flexible container 420 joined with at least one of the top and bottom surfaces thereof.

The flexible container 420 may be thermally fused to the top or bottom surface of the joining part 417".

The top surface of the joining part 417" may face the bottom surface of the main body 415". The joining part 417" may include a ring-shaped plate body having the flexible container 420 joined with the top surface thereof.

Figure 12:
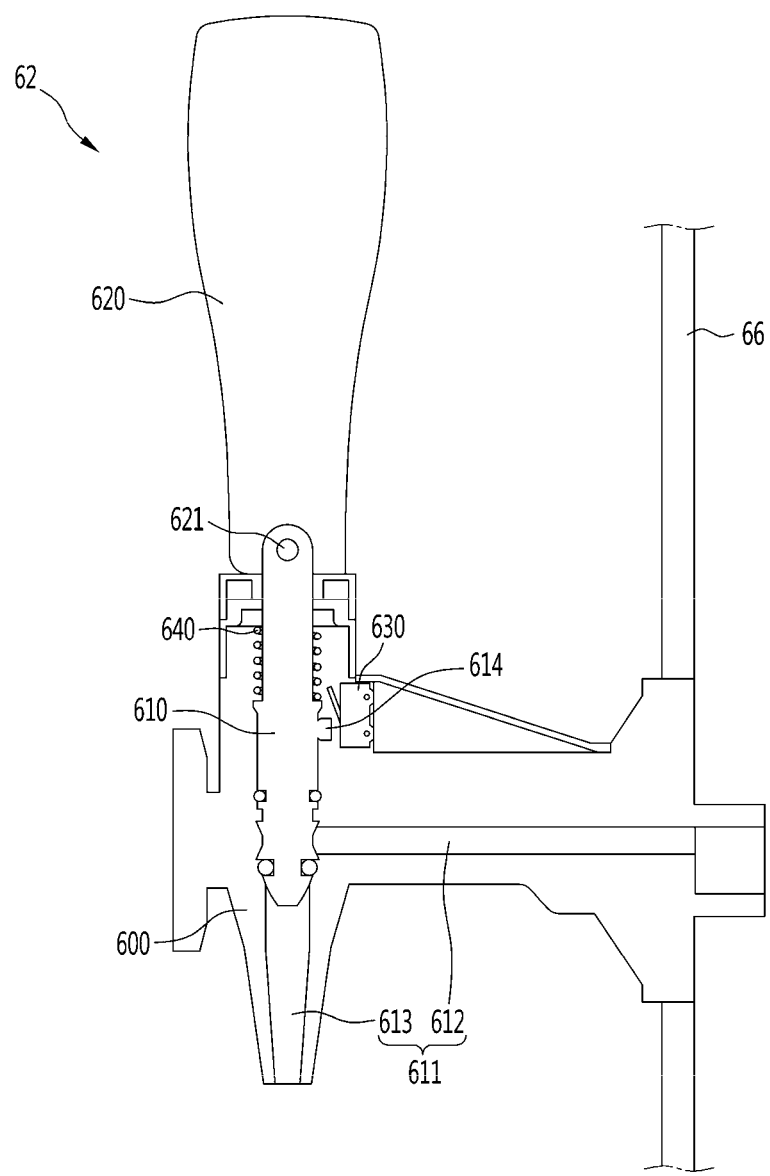
FIG. 12 is a diagram illustrating an example of a sectional view of a beverage extraction valve of the beverage maker according to some implementations.

FIG. 12 is a sectional view illustrating the beverage extraction valve of the beverage maker according to some implementations.

The beverage extraction valve 62 may include a valve body 600 in which a valve flow path 611 connected to the beverage extraction flow path 61 shown in FIG. 1 is formed; a lifting valve body 610 disposed in the valve body 600 to move up/down, the lifting valve body opening/closing the valve flow path 611; a rotating lever 620 rotatably connected to an upper portion of the lifting valve body 610 to moves up/down the lifting valve body 610 when the rotating lever 620 is rotated; and the micro switch 630 switched by the lifting valve body 610. The beverage extraction valve 62 may further include a valve spring 640 built in the valve body 600 to elastically pressurize the lifting valve body 610 in the lower direction.

The valve body 600 may be mounted to the center cover 66 shown in FIG. 2. The valve flow path 611 may include a horizontal flow path 612 formed long in the front-rear direction along the valve body 600, and a vertical flow path 613 formed to be bent in the lower direction at the front end of the horizontal flow path 612. Beverage guided to the beverage extraction flow path 61 shown in FIG. 1 may sequentially pass through the horizontal flow path 612 and the vertical flow path 613 when the horizontal flow path 612 is opened, and then drop downward from the vertical flow path 613. The valve body 600 may include a horizontal part in which the horizontal flow path 612 is formed, and a vertical part formed perpendicular to the horizontal part, the vertical part having the vertical flow path 613 formed therein.

The lifting valve body 610 may be disposed to move up/down in the valve flow path 611, particularly, the vertical flow path 613. The lifting valve body 610 may move down to a height at which the horizontal flow path 612 is blocked, and move up to a height at which the horizontal flow path 612 is opened. The lifting valve body 610 may be disposed such that an upper portion of the lifting valve body 610 protrudes upward of the valve body 600. A manipulating projection 614 that allows the micro switch to be point-contacted when the lifting valve body 610 moves up may protrude at the lifting valve body 610.

The rotating lever 620 may be connected to the upper portion of the lifting valve body 610 by a hinge 621. The rotating lever 620 may be erected in the vertical direction or laid in the horizontal direction in a state in which the rotating lever 620 is connected to the lifting valve body 610.

When the rotating lever 620 is laid in the horizontal direction, the lifting valve body 610 may move up to open the horizontal flow path 612. When the rotating lever 620 is erected in the vertical direction, the lifting valve body 610 may move down to close the horizontal flow path 612.

The micro switch 630 may be connected to the controller 109 shown in FIG. 3, and the controller 109 may control the beverage maker according to on/off of the micro switch 630.

The valve spring 640 may be disposed at an upper portion of the vertical part of the valve body 600 to elastically pressurize the lifting valve body 610 in the lower direction.

Figure 13:
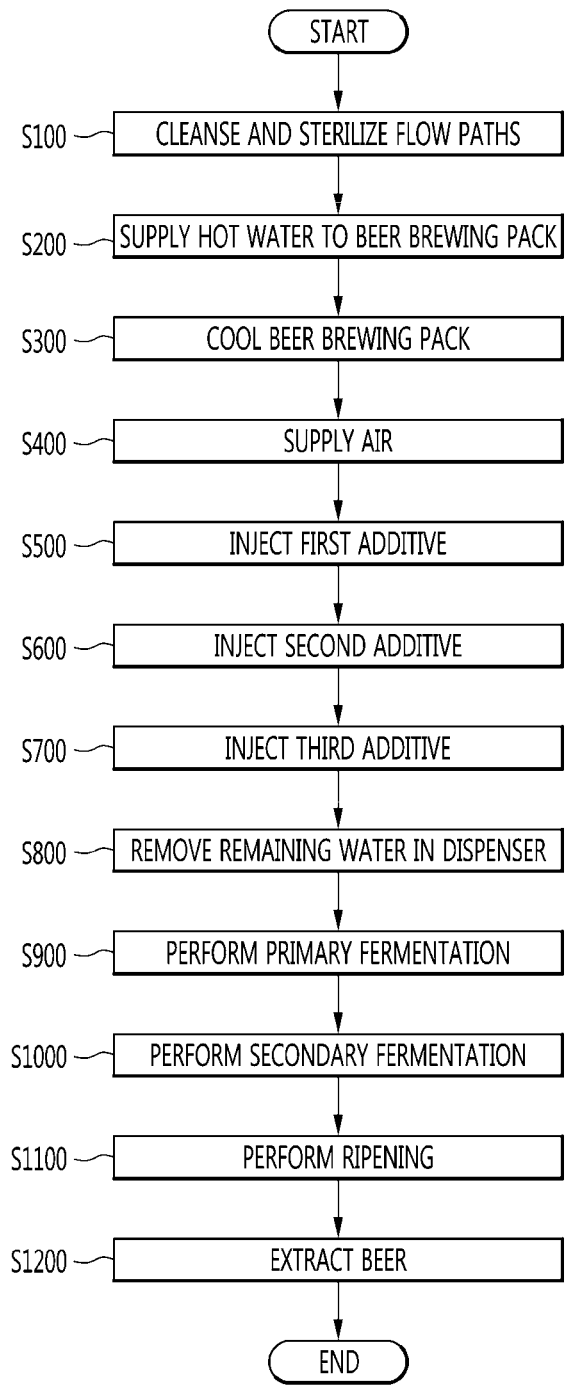
FIG. 13 is a flowchart illustrating an example of a control sequence of the beverage maker according to some implementations.

FIG. 13 is a flowchart illustrating a control sequence of the beverage maker according to some implementations.

The beverage maker of this implementation includes the controller 109. The user may input an operation command of the beverage maker by manipulating a wireless communication device such as the rotary knob 109A, or a remote controller, or a portable terminal. The controller 109 may control the beverage maker using a preset program according to a switching state of the rotary switch 109B or a signal applied to the wireless communication element. Here, the preset program may control the beverage maker according to a beverage ingredient process of the beverage maker.

Hereinafter, an operation of the beverage maker of this implementation will be described as follows. The following description will provide an example of a beverage maker, although implementations may be used to make any suitable beverage by fermentation.

The beverage maker of this implementation may include a cleansing and sterilizing course for cleansing and sterilizing flow paths in the beverage maker. The cleansing and sterilizing course may be performed separately from a beverage brewing course.

The cleansing and sterilizing course is preferably performed before the beverage brewing course is performed.

In addition, the cleansing and sterilizing course may be performed by a user input during the beverage brewing course. In this case, the cleansing and sterilizing course may be performed in a step in which the main valve 9 is closed and no additive is contained in the supplier 3, such as a primary fermentation step or secondary fermentation step which will be described later.

The cleansing and sterilizing course may be performed in a state in which the capsules C1, C2, and C3 are not accommodated in the supplier 3, and the beverage brewing course may be performed in a state in which the capsules C1, C2, and C3 are accommodated in the supplier 3 and the beverage brewing pack 12 is accommodated in the fermentation tank 112.

Hereinafter, the cleansing and sterilizing course will be first described.

The user may input a cleansing and sterilizing command through the input unit, remote controller, or portable terminal provided in the controller 109. The controller 109 may control the beverage maker in the cleansing and sterilizing course as the cleansing and sterilizing command is input.

The user may manipulate the beverage extraction valve 62 to be opened, and then input the cleansing and sterilizing command through the input unit, remote controller, or portable terminal.

If the micro switch 630 of the beverage extraction valve 62 is turned on, the controller 109 may turn on the water supply pump 52 and the water supply heater 53 so as to cleanse and sterilize the flow paths, and turn on the bypass valve 35 and the first, second, and third opening/closing valves 313, 323, and 333. In this case, the controller 109 may maintain the main valve 9 to be in a closed state. When the bypass valve 35 and the first, second, and third opening/closing valves 313, 323, and 333 are turned on, the bypass valve 35 and the first, second, and third opening/closing valves 313, 323, and 333 may all be opened.

When the water supply pump 52 is turned on, water of the water tank 51 may be discharged from the water tank 51 to pass through the water supply pump 52, and flow in the water supply heater 53 to be heated by the water supply heater 53. The water (i.e., hot water) heated by the water supply heater 53 may flow in the bypass flow path 34, the first capsule accommodation part 31, the second capsule accommodation part 32, and the third capsule accommodation part 33 through the water supply flow path 4. The water flowing in the bypass flow path 34, the first capsule accommodation part 31, the second capsule accommodation part 32, and the third capsule accommodation part 33 may flow in the main flow path 2. The water flowing in the main flow path 2 may pass through the beverage extraction flow path 61 and then be discharged through the beverage extraction valve 62.

In the above-described control of the beverage maker, the water supply flow path 4, the bypass flow path 34, the bypass valve 35, the first capsule accommodation part 31, the second capsule accommodation part 32, the third capsule accommodation part 33, the main flow path 2, the beverage extraction flow path 61, and the beverage extraction valve 62 may be cleansed and sterilized by the hot water heated by the water supply heater 53.

In the beverage maker, the above-described cleansing and sterilization may be performed for a cleansing setting time, and the cleansing and sterilizing step (S100) may be completed after the cleansing setting time. After the cleansing setting time elapses, the controller 109 may turn off the water supply pump 52 and the water supply heater 53, and turn off all of the bypass valve 35 and the first, second, and third opening/closing valves 313, 323, and 333. When the bypass valve 35 and the first, second, and third opening/closing valves 313, 323, and 333 are turned off, all of the bypass valve 35 and the first, second, and third opening/closing valves 313, 323, and 333 may be closed.

The user may manipulate the beverage extraction valve 62 to be closed such that contamination through the beverage extraction valve 62 is blocked in the cleansing and sterilizing step (S100).

In addition, the beverage maker of this implementation may include the beverage brewing course for brewing beverage.

Hereinafter, the beverage brewing course will be described.

In order to perform the beverage brewing course, the user may mount the beverage brewing pack 12 in the fermentation tank 112 by opening the fermentation tank cover 114 and inserting the beverage brewing pack 12 into the fermentation tank 112.

After that, the user may shut the fermentation tank cover 114, and the beverage brewing pack 12 may be accommodated and kept in the fermentation tank 112 and the fermentation tank cover 114. In addition, the user may insert the plurality of capsules C1, C2, and C3 into the supplier 3 and then cover the plurality of capsule accommodation parts 31, 32, and 33 with the lid module 37 before/after the beverage brewing pack 12 is mounted in the fermentation tank 112.

The user may input a beverage brewing command through the input unit, remote controller, or portable terminal provided in the controller 109. The controller 109 may control the beverage maker in the beverage brewing course as the beverage brewing command is input.

The controller 109 may initiate a water supplying step (S200) of supplying water to the beverage brewing pack 12 in the beverage brewing course. In the example of a beer maker, the water supplying step S200 may be a liquid malt forming step of forming liquid malt by uniformly mixing malt with hot water.

The controller 109, in the water supply step (S200), may turn on the water supply pump 52 and the water supply heater 53, turn on the bypass valve 35, and turn on the main valve 9.

The controller 109 may open the main valve 9 by turning on the main valve 9 that is in a turn-off state. The controller 109, in the water supplying step (S200), may maintain the first, second, and third opening/closing valves 313, 323, and 333 to be turned off. Meanwhile, the controller 109 may turn on the gas extraction valve 73 when water is supplied to the beverage brewing pack 12.

Water of the water tank 51 may be discharged from the water tank 51 to pass through the water supply pump 52, and flow in the water supply heater 53 to be heated by the water supply heater 53. The water heated by the water supply heater 53 may flow in the main flow path 2 by passing through the water supply flow path 4, the bypass flow path 34, and the bypass valve 35. The water flowing in the main flow path 2 may be introduced into the beverage brewing pack 12 by passing through the main valve 9. The hot water introduced into the beverage brewing pack 12 may be mixed with an ingredient (e.g., malt for a beer maker) accommodated in the beverage brewing pack 12, and the ingredient in the beverage brewing pack 12 may be mixed with water to be gradually diluted. Further, since hot water is supplied to the beverage brewing pack 12, the ingredient (e.g., malt for a beer maker) accommodated in the beverage brewing pack 12 can be rapidly and uniformly mixed with the hot water.

In the above-described water supplying step (S200), the bypass flow path 34 and the main flow path 2 may be in a state in which the bypass flow path 34 and the main flow path 2 have already been cleansed and sterilized by the cleansing and sterilizing step (S100), and uncontaminated clean hot water may be supplied to the beverage brewing pack 12.

Meanwhile, in the above-described water supplying step (S200), the water supply heater 53 preferably heats water to a temperature of 50° C. to 70° C., and the controller 109 may control the water supply heater 53 according to a temperature sensed by the thermistor 57.

The beverage maker may perform the above-described water supply step (S200) until an amount of water, sensed by the flow meter 56, reaches a set flow rate. If the amount of water, sensed by the flow meter 56, reaches the set flow rate, the water supplying step (S200) may be completed. When the water supply step (S200) is completed, the controller 109 may turn off the water supply pump 52 and the water supply heater 53, and turn off the bypass valve 35. In addition, the controller 109 may turn off the gas extraction valve 73 when the water supply step (S200) is completed.

The beverage maker, in the above-described water supplying step (S200), may be controlled such that air is introduced into the beverage brewing pack 12.

In addition, the controller 109 may complete the water supply step (S200) by primarily supplying hot water to the inside of the beverage brewing pack 12, injecting air into the beverage brewing pack 12, and then secondarily injecting hot water into the beverage brewing pack 12.

As an example of the water supplying step (S200), only a hot water supplying process may be performed.

As another example of the water supplying step (S200), a primary hot water supplying process of primarily supplying hot water, an air injecting process of injecting air, and a secondary hot water supplying process of secondarily injecting hot water may be sequentially performed.

First, the case where only the hot water supplying process is performed as an example of the water supplying step (S200) will be first described as follows.

When the hot water supplying process is initiated, the controller 109 may turn on the water supply pump 52 and the water supply heater 53, turn on the bypass valve 35, and turn on the main valve 9. The controller 109 may turn on the gas extraction valve 73 when the hot water supplying process is initiated. In addition, when the hot water supplying process is completed, the controller 109 may turn off the water supply pump 52 and the water supply heater 53, and turn off the bypass valve 35. The controller 109 may turn off the gas extraction valve 73 when the hot water supplying process is completed.

Hereinafter, a case where the primary hot water supplying process, the air injecting process, and the secondary hot water supplying process are sequentially performed as another example of the water supplying step (S200) will be described as follows.

When the primary hot water supplying process is initiated, the controller 109 may turn on the water supply pump 52 and the water supply heater 53, turn on the bypass valve 35, and turn on the main valve 9. In addition, the controller 109 may turn off the water supply pump 52 and the water supply heater 53 when the primary hot water supplying process is completed. The controller 109 may maintain the turn-on state of the bypass valve 35 and the main valve 9 when the primary hot water supplying process is completed. The controller 109 may maintain the turn-on state of the gas extraction valve 73 when the primary hot water supplying process is completed.

When the air injecting process is initiated, the controller 109 may turn on the air injection pump 82. While the air injection pump 82 is being turned on, air pumped by the air injection pump 82 may be introduced into the water supply flow path 4 through the air injection flow path 81, and then introduced into the beverage brewing pack 12 through the bypass flow path 34, the main flow path 2, and the main valve 9. The air introduced into the beverage brewing pack 12 may agitate the liquidized ingredient (e.g., liquid malt in a beer maker) to assist the ingredient and the hot water to be more uniformly mixed together.

If a pressure sensed by the pressure sensor 72 is equal to or greater than a set pressure, the controller 109 may complete the air injecting process, and turn off the air injection pump 82 so as to complete the air injecting process. When the air injecting process is completed, the controller 109 may maintain the main valve 9, the bypass valve 35, and the gas extraction valve 73 to be turned on.

When the secondary hot water supplying process is initiated, the controller 109 may turn on the water supply pump 52 and the water supply heater 53. Like the primary water supply process, water of the water tank 51 may be supplied to the beverage brewing pack 12, and new hot water may be additionally supplied to the beverage brewing pack 12. The controller 109 may determine whether the secondary hot water supplying process has been completed according to a flow rate sensed by the flow meter 56 during the secondary hot water supplying process. If the flow rate sensed by the flow meter 56 during the secondary hot water supplying process reaches a set flow rate, the controller 109 may determine that the secondary hot water supplying process has been completed, turn off the water supply pump 52 and the water supply heater 53, and turn off the main valve 9, the bypass valve 35, and the gas extraction valve 73.

Meanwhile, if the water supplying step (S200) is completed, the beverage maker may perform a fermentation tank cooling step (S300) of cooling the fermentation tank 112.

The controller 109 may control the compressor 131 and the expansion device 133 of the refrigeration cycle apparatus so as to cool the fermentation tank 112. A refrigerant compressed by the compressor 131 may be condensed by the condenser 132 and then expanded by the expansion device 133. The refrigerant expanded by the expansion device 133 may take heat from the fermentation tank 112 while passing through the evaporator 134, and be evaporated. The refrigerant passing through the evaporator 134 may be sucked into the compressor 131. The fermentation tank 112 may be gradually cooled when the compressor 131 is driven, and the beverage brewing pack 12 accommodated in the fermentation tank 112 and the liquidized ingredient (e.g., liquid malt in a beer maker) accommodated in the beverage brewing pack 12 may be cooled.

When the fermentation tank 112 is cooled as described above, the beverage maker may cool the beverage brewing pack 12 to a medium temperature, e.g., a temperature of 23° C. to 27° C., and the controller 109 may control the compressor 131 according to a temperature sensed by the temperature sensor 16 installed in the fermentation tank 112. If the temperature sensed by the temperature sensor 16 exceeds a compressor-on temperature, the controller 109 may turn on the compressor 131. If the temperature sensed by the temperature sensor 16 is equal to or less than a compressor-off temperature, the controller 109 may turn off the compressor 131.

If the temperature sensed by the temperature sensor 16 is equal to or less than the compressor-off temperature at least once after the above-described fermentation tank cooling step S300 is initiated, the beverage maker may perform a mixing step (S400) of mixing the liquidized ingredient (e.g., malt in a beer maker) by supplying air to the inside of the beverage brewing pack 12.

The beverage maker may control the compressor 131 to be turned on/off according to the temperature sensed by the temperature sensor 16 even during the mixing step (S400), and the on/off control of the compressor 131 may be continued until additive injecting steps (S500, S600, and S700) which will be describe later are completed.

The controller 109 may turn on the air injection pump 82, and turn on the bypass valve 35, the main valve 9, and the gas extraction valve 73. While the air injection pump 82 is being turned on, the air pumped by the air injection pump 82 may be introduced into the water flow path 4 through the air injection flow path 81, and then introduced into the beverage brewing pack 12 through the bypass flow path 34, the main flow path 2, and the main valve 9. The air introduced into the beverage brewing pack 12 may agitate the liquidized ingredient (e.g., liquid malt for a beer maker) to assist the ingredient and the hot water to be more uniformly mixed together.

The controller 109 may turn on the air injection pump 82 and mix the liquidized ingredient with air for a mixing set time. If the air injection pump 82 is turned on and the mixing set time elapses, the controller 109 may turn off the air injection pump 82, and turn off the bypass valve 35 and the gas extraction valve 73. If the mixing set time elapses, the beverage maker may complete the mixing step (S400).

The beverage maker may perform the additive injecting steps (S500, S600, and S700) after the mixing step (S400).

In the additive injecting steps (S500, S600, and S700), the beverage maker may simultaneously or sequentially inject an additive of the first capsule C1, an additive of the second capsule C2, and an additive of the third capsule C3.

The controller 109 may sequentially perform an additive injecting process (S500) of the first capsule C1, an additive injecting process (S600) of the second capsule C2, and an additive injecting process (S700) of the third capsule C3.

In the additive injecting process (S500) of the first capsule C1, the controller 109 may turn on the water supply pump 52, the main valve 9, the first opening/closing valve 313, and the gas extraction valve 73 for a first additive set time. When the water supply pump 52 is turned on, water of the water tank 51 may be introduced into the first capsule C1 by passing through the water supply pump 52, passing through the water supply heater 53, and then passing through the water supply flow path 4. The water introduced into the first capsule C1 may be mixed with the additive accommodated in the first capsule C1, flow in the main flow path together with the additive accommodated in the first capsule C1, and be injected into the beverage brewing pack 12 through the main flow path 2. If the first additive set time elapses, the controller 109 may turn off the water supply pump 52 and the first opening/closing valve 313, and complete the additive injecting process (S500) of the first capsule C1.

In the additive injecting process (S600) of the second capsule C2, the controller 109 may turn on the water supply pump 52 and the second opening/closing valve 323 for a second additive set time. When the water supply pump 52 is turned on, water of the water tank 51 may be introduced into the second capsule C2 by passing through the water supply pump 52, passing through the water supply heater 53, and then passing through the water supply flow path 4. The water introduced into the second capsule C2 may be mixed with the additive accommodated in the second capsule C2, flow in the main flow path 2 together with the additive accommodated in the second capsule C2, and be injected into the beverage brewing pack 12 through the main flow path 2. If the second additive set time elapses, the controller 109 may turn off the water supply pump 52 and the second opening/closing valve 323, and complete the additive injecting process (S600) of the second capsule C2.

In the additive injecting process (S700) of the third capsule C3, the controller 109 may turn on the water supply pump 52 and the third opening/closing valve 333 for a third additive set time. When the water supply pump 52 is turned on, water of the water tank 51 may be introduced into the third capsule C3 by passing through the water supply pump 52, passing through the water supply heater 53, and then passing through the water supply flow path 4. The water introduced into the third capsule C3 may be mixed with the additive accommodated in the third capsule C3, flow in the main flow path 2 together with the additive accommodated in the third capsule C3, and be injected into the beverage brewing pack 12 through the main flow path 2. If the third additive set time elapses, the controller 109 may turn off the water supply pump 52 and the third opening/closing valve 333, and complete the additive injecting process (S700) of the third capsule C3.

If all of the additive injecting steps (S500, S600, and S700) are completed, the beverage maker may perform a supplier remaining water removing step (S800) of removing remaining water in the supplier 3.

In the supplier remaining water removing step (S800), the controller 109 may turn on the air injection pump 82, turn on the first opening/closing valve 313, the second opening/closing valve 323, and the third opening/closing valve 333, and turn on the main valve 9 and the gas extraction valve 73.

When the air injection pump is turned on, air may pass through the air injection flow path 81 and the water supply flow path 4 and then be supplied to the first capsule accommodation part 31, the second capsule accommodation part 32, and the third capsule accommodation part 33, to blow water remaining in the first capsule accommodation part 31, the second capsule accommodation part 32, and the third capsule accommodation part 33. The air may be moved to the beverage brewing pack 12 together with the remaining water moved in the first capsule accommodation part 31, the second capsule accommodation part 32, and the third capsule accommodation part 33.

The controller 109 may turn on the air injection pump 82 for a remaining water removing set time. If the remaining water removing set time elapses, the controller 109 may turn off the air injection pump 82, and turn off the first opening/closing valve 313, the second opening/closing valve 323, the third opening/closing valve 333, the main valve 9, and the gas extraction valve 73.

If the remaining water removing set time elapses, the beverage maker may complete the supplier remaining water removing step (S800).

After the supplier remaining water removing step (S800) is completed, the beverage maker may sequentially perform a first fermentation step (S900) and a second fermentation step (S1000).

In the primary fermentation step (S900), the controller 109 may control the compressor 131 to a primary fermentation target temperature, and control the compressor 131 such that the temperature sensed by the temperature sensor 16 maintains a primary fermentation set temperature range. After the first fermentation step (S900) is initiated, the controller 109 may periodically turn on and then turn off the gas extraction valve 73, and store a pressure sensed by the pressure sensor 72 in a data storage part, such as an electronic memory device, while the gas extraction valve 73 is being turned on. If a change in pressure periodically sensed by the pressure sensor 72 exceeds a primary fermentation set pressure, the controller 109 may determine that primary fermentation has been completed, and complete the primary fermentation step (S900).

After the primary fermentation step (S900) is completed, the controller 109 may initiate the secondary fermentation step (S1000). In the secondary fermentation step (S1000), the controller 109 may control the compressor 131 to a secondary fermentation target temperature, and control the compressor 131 such that the temperature sensed by the temperature sensor 16 maintains a secondary fermentation set temperature range. After the second fermentation step (S1000) is initiated, the controller 109 may periodically turn on and then turn off the gas extraction valve 73, and store a pressure sensed by the pressure sensor 72 in the data storage part while the gas extraction valve 73 is being turned on. If a change in pressure periodically sensed by the pressure sensor 72 exceeds a secondary fermentation set pressure, the controller 109 may determine that secondary fermentation has been completed, and complete the secondary fermentation step (S1000).

If both of the primary fermentation step (S900) and the secondary fermentation step (S1000) are completed, the beverage maker may perform a ripening step (S1100).

In the ripening step (S1100), the controller 109 may wait during a ripening time, and control the compressor 131 such that the temperature of beverage maintains between an upper limit value of a set ripening temperature and a lower limit value of the set ripening temperature during the ripening time. If the temperature sensed by the temperature sensor 16 is equal to or less than the lower limit value of the set ripening temperature, the controller 109 may turn off the compressor 131.

If the temperature sensed by the temperature sensor 16 is equal to or greater than the upper limit value of the set ripening temperature, the controller 109 may turn on the compressor 131.

In the beverage maker, if the ripening time elapses, all of the steps of brewing beverage may be completed, and the user may extract the beverage by manipulating the beverage extraction valve 62.

If the user manipulates the beverage extraction valve 62 to be opened, the micro switch 630 may be point-contacted, and the controller 109 may open the main valve 9 in the state in which all of the steps of brewing the beverage are completed. In addition, the controller 109 may turn on the air pump 152 and the air control valve 156.

When the air pump 152 is turned on, air may be supplied to the inside of the fermentation tank assembly 11 through the air supply flow path 154. The air supplied to the inside of the fermentation tank assembly 11 may pressurize the beverage ingredient pack 12. When the beverage ingredient pack 12 is pressurized by the air, beverage of which fermentation and ripening have been completed in the beverage ingredient pack 12 may flow in the main flow path 2. The beverage flowing in the main flow path 2 may pass through the beverage extraction flow path 61, flow in the beverage extraction valve 62, and then be extracted to the outside through the beverage extraction valve 62.

Meanwhile, after the supplier remaining water removing step (S800) is completed, the beverage making apparatus may perform a fermenting step (S900 and S1000) of fermenting ingredients in the beverage ingredient pack 12.

The fermenting step (S900 and S1000) may include a primary fermenting process (S900) and a secondary fermenting step (S1000), which are sequentially performed.

In the example of a beverage making apparatus as a beer maker, alcohol and carbon dioxide are simultaneously generated from beer ingredients in the fermenting step (S900 and S1000). In the fermenting step (S900 and S1000), the primary fermenting process (S900) of first generating alcohol (ethanol) and collecting no carbon dioxide may be first performed, and the secondary fermenting process (S1000) of first generating and collecting carbon dioxide after the primary fermenting process (S900) may be performed.

The beverage maker may self-determine whether the primary fermenting process (S900) has been completed, using a pressure sensed by the pressure sensor 72 and opening/closing of the gas extraction valve 73, and determine whether the secondary fermenting process (S1000) has been completed.

In the primary fermenting process (S900), the controller 109 may control the compressor 131 to a primary fermentation target temperature, and control the compressor 131 such that a temperature sensed by the temperature sensor 16 maintains a primary fermentation set temperature range.

Here, the primary fermenting process may include an open fermenting process in which the fermentation of the beverage is performed as gas from the beverage ingredient pack 12 is discharged to the outside, and a close fermenting process in which the fermentation of the beverage is performed in a state in which the gas of the beverage ingredient pack is not discharged to the outside.

The open fermenting process of the primary fermenting process is a process in which the gas extraction valve 73 is maintained in an open-state for an open set time, and the close fermenting process of the primary fermenting process is a process in which the gas extraction valve 73 is maintained in a close-state for a close set time.

In the primary fermenting process, the open fermenting process may be first performed, and the close fermenting process may be performed after the open fermenting process. In the primary fermenting process, the open fermenting process and the close fermenting process may be alternately performed as time elapses.

The beverage maker may sense a pressure of the pressure sensor 72 during the primary fermenting process, and sense completion of the primary fermenting process according to a pressure sensed by the pressure sensor 72.

The beverage maker may determine the completion of the primary fermenting process according to a pressure measured by the pressure sensor 72 during the close fermenting process.

If the primary fermenting process (S900) is completed, the controller 109 may initiate the secondary fermenting process (S1000).

In the secondary fermenting process (S1000), the controller 109 may control the compressor 131 to a secondary fermentation target temperature, and control the compressor 131 such that the temperature sensed by the temperature sensor 16 maintains a secondary fermentation set temperature range.

In the secondary fermenting process (S1000), beverage may be fermented while the pressure in the beverage ingredient pack 12 is maintained to a fermentation tank set pressure range.

The controller 109 may maintain the pressure in the beverage ingredient pack 12 to the fermentation tank set pressure while comparing the pressure sensed by the pressure sensor with a set pressure and opening/closing the gas extraction valve 73.

Here, the set pressure is a pressure set lower than a fermentation tank target pressure. The set pressure is a pressure set lower by a reference pressure than the fermentation tank target pressure. For example, when the fermentation tank target pressure is 1.5 bar, the reference pressure may be any one pressure selected from 0.045 bar to 0.075 bar, which is within 3% to 5% of the target pressure.

In the secondary fermenting process (S1000), if a sensed value P of the pressure sensor 72 exceeds the set pressure, the gas extraction valve 73 may be opened. If the sensed value P of the pressure sensor 72 is equal to or less than the set pressure, the gas extraction valve 73 may be closed.

The secondary fermenting process (S1000) is a process of additionally fermenting beverage ingredients while determining whether fermentation has been completed, using a set time (e.g., 12 hours or 24 hours) as a period.

In the secondary fermenting process (S1000), the close fermenting process and the open fermenting process may be repeated as time elapses, and a number of times of performing the open fermenting process per set time may be gradually decreased as fermentation is continued.

In order to determine a point of time when the secondary fermenting process (S1000) is completed, the controller 109 may count a number of times of opening the gas extraction valve 73. If the gas extraction valve 73 is not opened during the set time or if the number of times of opening the gas extraction valve 73 is less than a set number of times, the controller may self-determine that the secondary fermenting process (S1000) has been completed.

The controller 109 may determine that the secondary fermenting process has been completed according to the number of times of performing the open fermenting process.

If the number of time of opening the gas extraction valve 73 is less than the set number of times, the fermenting step (S900 and S1000) may be completed.

The beverage maker may perform a ripening step (S1100) after the fermenting step (S900 and S1000) is completed. If the secondary fermenting process (S1000) is completed, the ripening step (S1100) may be performed.

During the ripening step (S1100), the gas extraction valve 73 may be maintained in the close-state for a ripening set time.

The ripening set time may be set longer than the set time.

The ripening step (S1100) may be performed during the ripening set time. If the ripening set time elapses, the ripening step (S1100) may be completed.

The controller 109 may control the compressor 131 such that a temperature of the beverage is maintained between upper and lower limit values of a ripening set temperature.

If the temperature sensed by the temperature sensor 16 is equal to or less than the lower limit value of the ripening set temperature, the controller 109 may turn off the compressor 131. If the temperature sensed by the temperature sensor 16 is equal to or greater than the upper limit value of the ripening set temperature, the controller 109 may turn on the compressor 131.

If the ripening set time elapses, the beverage maker may end the entire brewing of the beverage.

The controller 109 may display, through the display 109D or the like, that the brewing of the beverage has been ended, and the user may extract the beverage by manipulating the beverage extraction valve 62 (S1200).

Figure 14:
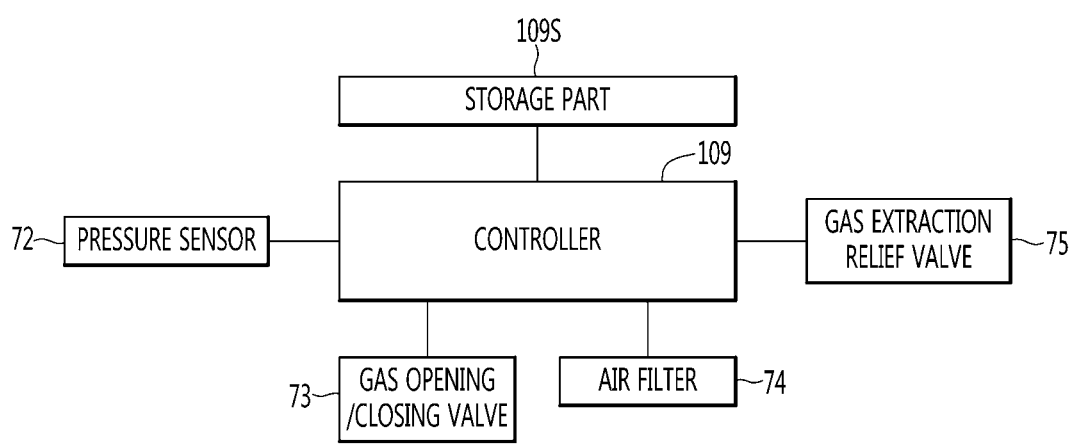
FIG. 14 is diagram illustrating an example of a configuration view of a control system for primary fermentation and secondary fermentation in a beverage maker according to some implementations.
Figure 15:
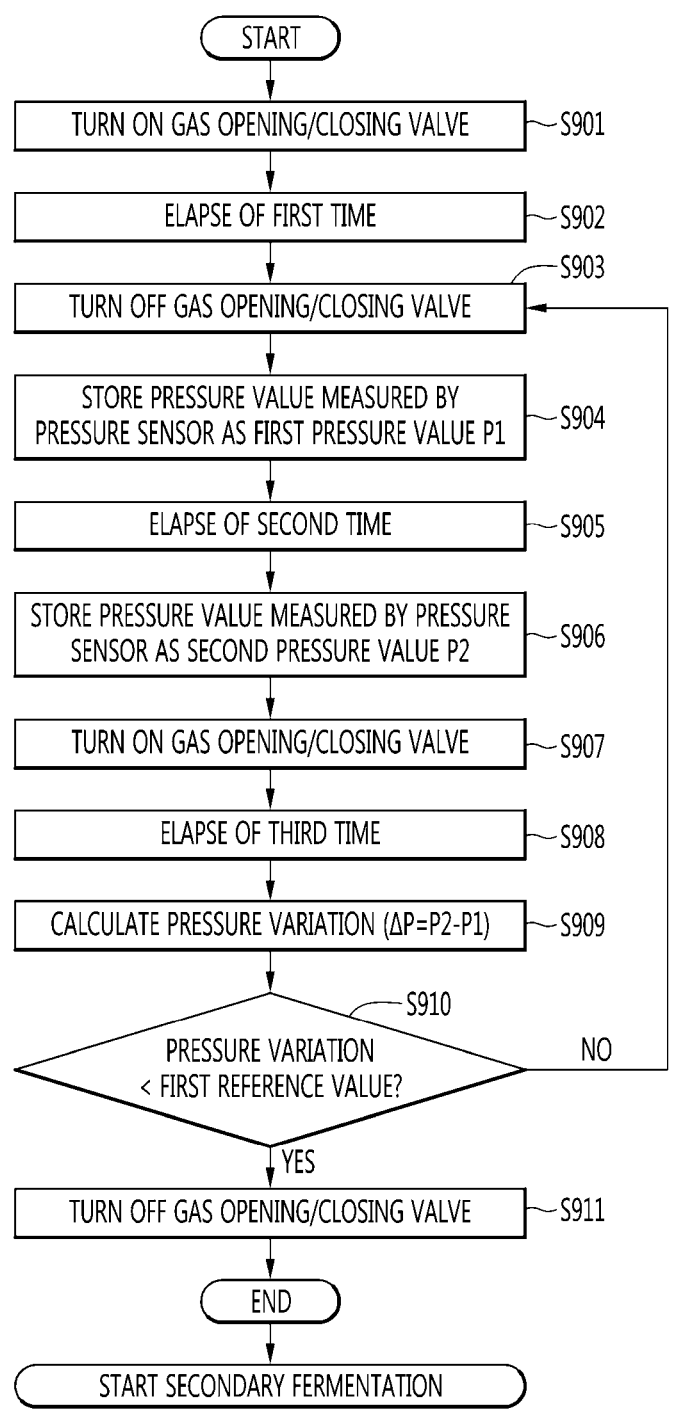
FIG. 15 is a flowchart illustrating an example of a control sequence of the primary fermentation in the beverage maker according to some implementations.
Figure 16:
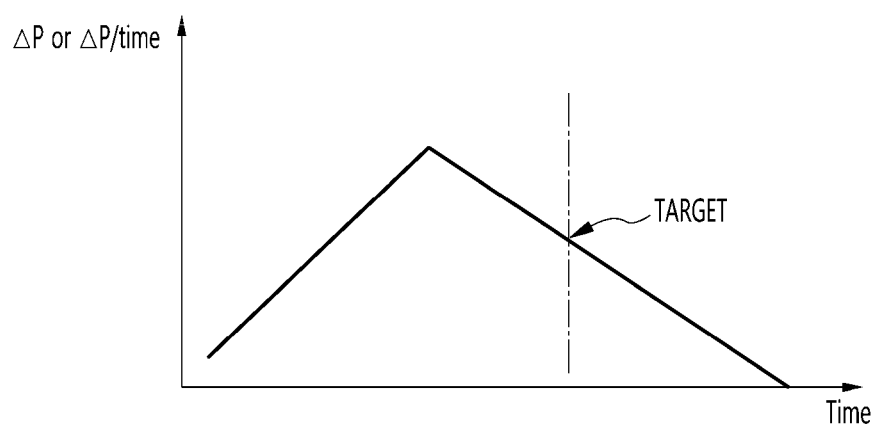
FIG. 16 is a diagram illustrating a graph of an example of a change in pressure with respect to time during the primary fermentation.
Figure 17:
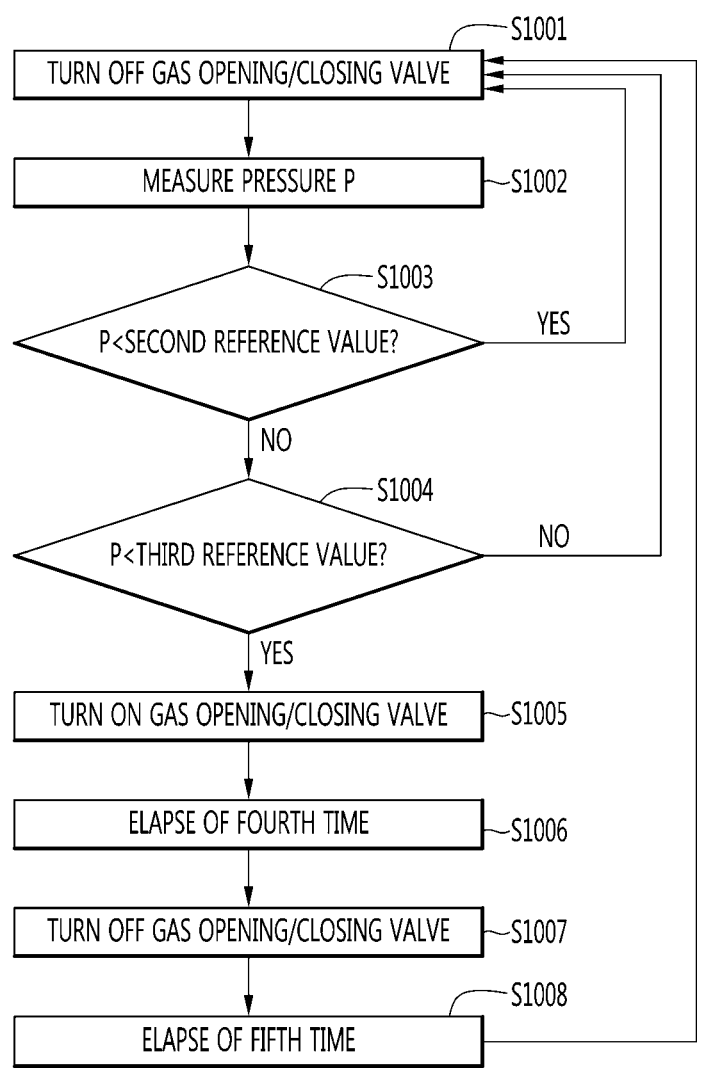
FIG. 17 is a flowchart illustrating an example of a control sequence of the secondary fermentation in the beverage maker according to some implementations.

FIG. 14 is an example of a configuration view of a control system for primary fermentation and secondary fermentation in the beverage maker according to the implementation. FIG. 15 is a flowchart illustrating an example of a control sequence of the primary fermentation in the beverage maker according to the implementation. FIG. 16 is a graph illustrating an example of a change in pressure with respect to time during the primary fermentation. FIG. 17 is a flowchart illustrating an example of a control sequence of the secondary fermentation in the beverage maker according to the implementation.

The primary fermentation may be performed through an opened system. That is, air may come in and out of the beverage ingredient pack 12. In the example of a beer making apparatus, if the primary fermentation is performed, alcohol and carbon dioxide may be generated.

The primary fermentation may be performed of approximately 5 to 8 days. If the primary fermentation is completed, the secondary fermentation may be started.

The secondary fermentation may be performed through a closed system. That is, air cannot come in and out of the beverage ingredient pack 12. However, since a gas, such as carbon dioxide, is generated in a fermenting process, the pressure in the beverage ingredient pack 12 may be excessively increased. Therefore, gas in the beverage ingredient pack 12 may be properly extracted such that the pressure in the beverage ingredient pack 12 is not excessively increased.

The beverage maker may include the controller 109 so as to perform the primary fermentation and the secondary fermentation. The controller 109 may control the gas extraction flow path 71, the pressure sensor 72, the gas opening/closing valve 73, the air filter 74, the gas extraction relief valve 75, and a memory device, such as data storage part 109S.

The memory device, such as data storage part 109S, may store various types of information, such as a pressure value measured by the pressure sensor 72. Also, the data storage part 109S may store a pressure value corresponding to a reference value. The controller 109 may control the data storage part 109S to store a pressure value, and load the stored pressure value.

A control system for fermentation may include a fermentation tank assembly 11 including a fermentation tank having an opening formed therein and a fermentation tank cover opening/closing the opening. A beverage ingredient pack 12 may be inserted and accommodated in the fermentation tank through the opening, where the beverage ingredient pack 12 contains beverage ingredient ingredients therein. A gas extraction flow path 71 may be connected to the fermentation tank cover, and a gas opening/closing valve 73 may be installed in the gas extraction flow path 71. One or more processors, such as a controller 109, may control the gas opening/closing valve 73 in fermentation of the beverage ingredients.

The primary fermentation may be performed through an opened system. The controller 109 may control the gas opening/closing valve 73 to be turned on. If the gas opening/closing valve 73 is turned on, the gas extraction flow path 71 may be opened (S901).

The primary fermentation may be performed such that a first time elapses in the state in which the gas opening/closing valve is turned on and the gas extraction flow path 71 is opened (S902).

The control system may determine a time when the primary fermentation is completed. If the primary fermentation is completed, the secondary fermentation may be started. Therefore, it is determined at an appropriate time that the primary fermentation has been completed, and the second fermentation is to be started.

To this end, the controller 109 may use a pressure sensor 72 installed in the gas extraction flow path 71. The controller 109 may sense a change in pressure of the gas extraction flow path 71 using the pressure sensor 72, and accordingly, a time when the primary fermentation is completed may be determined.

If the gas extraction flow path 71 is opened and the first time elapses, the controller 109 may control the gas opening/closing valve 73 to be turned off. If the gas opening/closing valve is turned off, the gas extraction flow path 71 may be closed (S903).

If the gas extraction flow path 71 is closed, the controller 109 may control the pressure sensor 72 to measure a pressure. Also, the controller 109 may store a pressure value measured by the pressure sensor 72 as a first pressure value P1 in the data storage part 109S (S904). The first pressure value P1 measured just after the gas extraction flow path 71 being opened is closed may be a value close to the atmospheric pressure.

The controller 109 may control a gas opening/closing flow path such that the gas extraction flow path 71 is closed for a second time (S905).

If the second time elapses, the controller 109 may control the pressure sensor 72 to measure a pressure. Also, the controller 109 may store a pressure value measured by the pressure sensor 72 as a second pressure value P2 in the data storage part 109S (S906). While the gas extraction flow path 71 is being closed, fermentation may be performed in the beverage ingredient pack 12, and a gas, such as carbon dioxide, may be generated due to the fermentation. Therefore, the second pressure value P2 may be a value greater than the first pressure value P1 due to the generation of the carbon dioxide.

If the second pressure value P2 is stored, the controller 109 may control the gas opening/closing valve 73 to be turned on. If the gas opening/closing valve 73 is turned on, the gas extraction flow path 71 may be opened (S907). In this case, the carbon dioxide generated due to the fermentation may be extracted to the outside of the beverage maker along the gas extraction flow path 71.

The controller 109 may control the gas opening/closing flow path such that the gas extraction flow path 71 is opened for a third time (S908).

The controller 109 may calculate a pressure variation ($\Delta P = P2 - P1$) using the second pressure value P2 and the first pressure value P1, which are stored in the data storage part 109S (S909). The pressure variation ($\Delta P$) may be a positive number. Alternatively, the controller 109 may calculate a value obtained by dividing the second time into the pressure variation ($\Delta P$).

The controller 109 may compare and calculate whether the pressure variation ($\Delta P$) is smaller than a first reference value (S910). The first reference value may be a value previously stored in the data storage part 109S.

If the pressure variation ($\Delta P$) is greater than the first reference value, the controller 109 may determine that the primary fermentation has not been completed, and control the gas opening/closing valve 73 to be turned off. In addition, previous steps (S903 to S909) may be repeated.

If the pressure variation ($\Delta P$) is smaller than the first reference value, the controller 109 may determine that the primary fermentation has been completed, and control the gas opening/closing valve 73 to be turned off (S911). Also, the controller 109 may end the primary fermentation and start the secondary fermentation.

That is, the controller 109 may calculate a fermentation degree by calculating the pressure variation ($\Delta P$). Also, the controller 109 may determine whether the primary fermentation is to be ended based on the fermentation degree.

A graph illustrating the pressure variation ($\Delta P$) with respect to time will be described. As time elapses, the pressure variation ($\Delta P$) may be gradually increased. If the pressure variation ($\Delta P$) reaches the maximum value, the pressure variation ($\Delta P$) may be gradually decreased as time elapses.

The pressure variation ($\Delta P$) with respect to time may be related to a generation speed of the carbon dioxide generated in the beverage ingredient pack 12 due to the fermentation. That is, the generation speed of the carbon dioxide is gradually increased at the early stage of the primary fermentation, but may be gradually decreased after the generation speed of the carbon dioxide reaches the maximum speed.

The controller 109 may repeatedly measure the pressure variation ($\Delta P$). If the pressure variation ($\Delta P$) is smaller than the first reference value, the controller 109 may determine that the primary fermentation has been completed.

In the graph illustrating the pressure variation ($\Delta P$) with respect to time, the first reference value may be a value corresponding to two times. However, the primary fermentation may be performed for approximately 5 to 8 days. Therefore, if the pressure variation (ΔP) is smaller than the first reference value after a certain time from when the primary fermentation is started, the controller 109 may determine that the primary fermentation has been completed.

In the graph illustrating the pressure variation (ΔP) with respect to time, the vertical axis may represent, instead of the pressure variation (ΔP), a value obtained by dividing the second time into the pressure variation (ΔP).

If the gas opening/closing valve 73 is turned off (S1001) and the primary fermentation is completed, the secondary fermentation may be started.

In the secondary fermentation, if fermentation is performed for a certain time without separately calculating a fermentation degree, the controller 109 may determine that the secondary fermentation has been completed. The controller 109 may control the gas opening/closing valve 73 to be turned off while the secondary fermentation is being performed. If the gas opening/closing valve 73 is turned off, the gas extraction flow path 71 may be closed.

However, since carbon dioxide is generated in a fermenting process, the pressure in the beverage ingredient pack 12 may be excessively increased. Therefore, gas in the beverage ingredient pack 12 may be properly extracted such that the pressure in the beverage ingredient pack 12 is not excessively increased.

The controller 109 may control the pressure sensor 72 to measure a pressure P (S1002).

The controller 109 may compare and calculate whether the measured pressure P is smaller than a second reference value (S1002). The second reference value may be a value previously stored in the data storage part 109S.

If the measured pressure P is smaller than the second reference value, the controller 109 may control the gas opening/closing valve 73 to maintain the off-state.

If the measured pressure P is greater than the second reference value, the controller 109 may compare and calculate whether the measured pressure P is greater than a third reference value (S1004). The third reference value may be a value previously stored in the data storage part 109S.

If the measured pressure P is smaller than the third reference value, the controller 109 may control the gas opening/closing valve 73 to maintain the off-state.

If the measured pressure P is greater than the third reference value, the controller 109 may control the gas opening/closing valve 73 to be turned on (S1005). If the gas opening/closing valve 73 is turned on, the gas extraction flow path 71 may be opened. In this case, the carbon dioxide generated due to the fermentation may be extracted to the outside of the beverage maker along the gas extraction flow path 71.

If the gas extraction flow path 71 is opened and a fourth time elapses (S1006), the controller 109 may control the gas opening/closing valve 73 to be turned off (S1007). If the gas opening/closing valve 73 is turned off, the gas extraction flow path 71 may be closed.

If the gas opening/closing valve 73 is turned off and a fifth time elapses (S1008), the controller 109 may repeat the previous steps (S1001 to S1008).

The gas extraction flow path 71 may further include a gas discharge relief valve 75. The gas discharge relief valve 75 may prevent the pressure in the beverage ingredient pack 12 from being rapidly increased.

Components included in the gas extraction flow path 71 may be the gas discharge relief valve 75, the pressure sensor 72, the gas opening/closing valve 73, and an air filter 74 along the direction in which gas in the beverage ingredient pack 12 is discharged.

The controller 109 may calculate a carbonic acid amount of the beverage in the primary fermentation and the secondary fermentation. A solubility of carbon dioxide with respect to temperature and pressure may be previously stored data. The controller 109 may measure a pressure in the beverage ingredient pack 12 and a temperature in the fermentation tank. Therefore, the controller 109 may calculate, in real time, a carbonic acid amount of the beverage by comparing the previously stored data of the solubility of the carbon dioxide with the measured pressure or temperature.

Specifically, in the primary fermentation, the controller 109 may measure a pressure using the pressure sensor 72 in a state in which the gas opening/closing valve 73 is opened, and calculate a carbonic acid amount. In the secondary fermentation, the controller 109 may measure a pressure using the pressure sensor 72 in a state in which the gas opening/closing valve 73 is closed, and calculate a carbonic acid amount.

The pressure in the beverage ingredient pack 12 may be excessively increased due to carbon dioxide generated in the secondary fermentation. In addition, the controller 109 may turn on the gas opening/closing valve 73 to decrease the pressure in the beverage ingredient pack 12. In the secondary fermentation, the controller 109 may repeatedly turn on and off the gas opening/closing valve 73. If the gas opening/closing valve 73 is not turned on for a certain time in the secondary fermentation, the controller 109 may determine that the secondary fermentation has been completed and the brewing of the beverage has been ended. If a certain time elapses after the gas opening/closing valve 73 is turned off in the secondary fermentation, the controller 109 may determine that the secondary fermentation has been completed and the brewing of the beverage has been ended.

Figure 18:
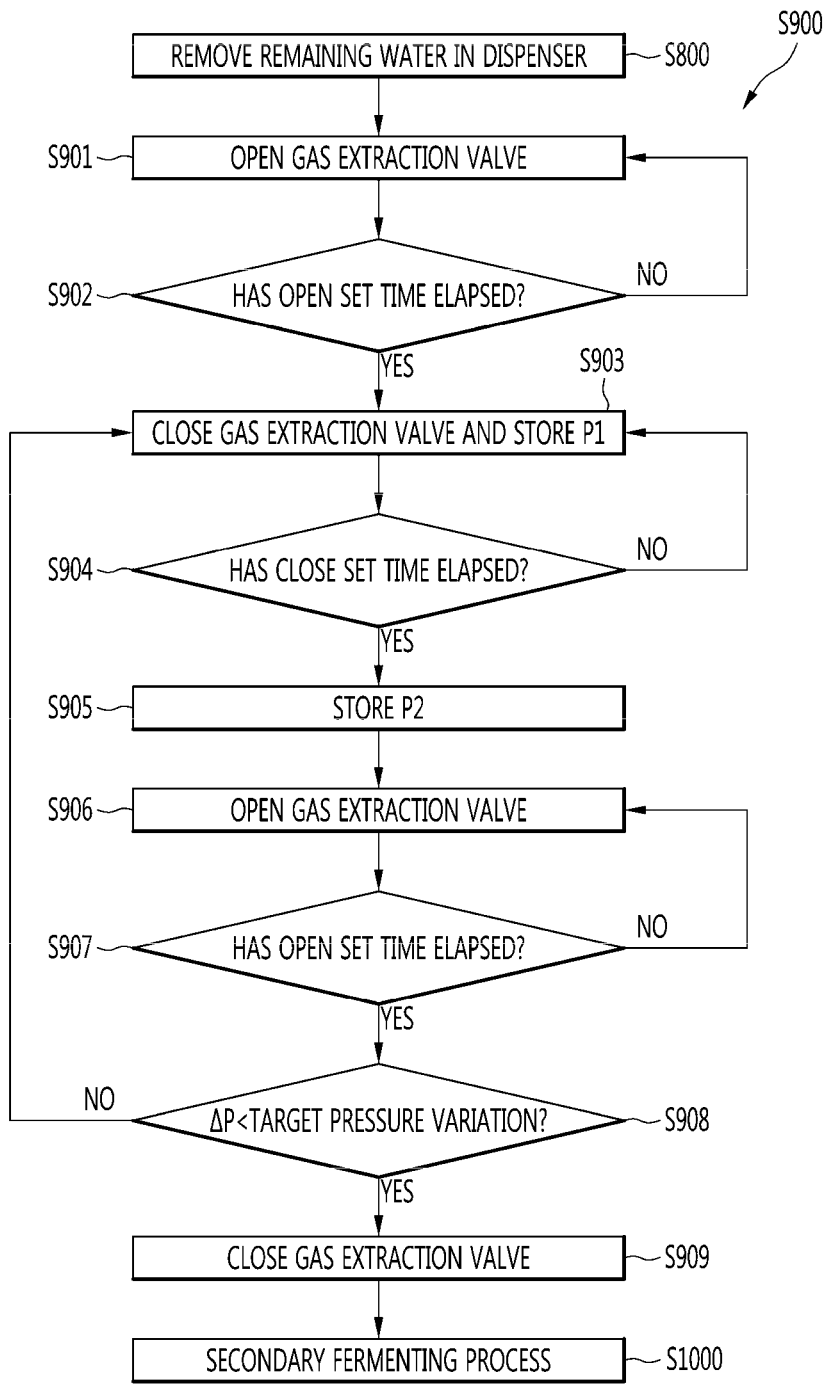
FIG. 18 is a flowchart illustrating another example of the primary fermenting process shown in FIG. 13.

FIG. 18 is a flowchart illustrating another example of the primary fermenting process shown in FIG. 13.

The primary fermenting process (S900) may be initiated when the supplier remaining water removing step (S800) is completed.

In the primary fermenting process (S900), the gas extraction valve 73 may be opened for the open set time and then closed. The gas extraction value 73 may be maintained in the close-state for a close set time.

If the variation (ΔP) in pressure sensed by the pressure sensor 72 for the close set time is less than a target pressure variation, the primary fermenting process (S900) may be ended.

If the supplier remaining water removing step (S800) is completed, the controller 109 may turn off the gas extraction valve 73 (S901).

The controller 109 may maintain the gas extraction valve 73 to be opened for the open set time. The controller 109 may maintain the gas extraction valve 73 to be opened until a time measured by a timer reaches the open set time after the gas extraction valve 73 is opened.

If the time measured by the timer reaches the open set time after the gas extraction valve 73 is opened, the controller 109 may close the gas extraction valve 73. At a point of time when the gas extraction valve 73 is closed, the controller 109 may store a first pressure P1 sensed by the pressure sensor 72 in a data storage part (S902 and S903).

The controller 109 may maintain the gas extraction valve 73 to be closed for the close set time after the gas extraction valve 73 is closed. The controller 109 may maintain the gas extraction valve 73 to be closed until the time measured by the timer reaches the close set time after the gas extraction valve 73 is closed.

If the time measured by the timer reaches the close set time after the gas extraction valve 73 is closed, the controller 109 may store a second pressure P2 sensed by the pressure sensor 72 in the data storage part (S904 and S905). Also, the controller 109 may turn off the gas extraction valve 73 (S906).

After the gas extraction valve 73 is opened, the controller 109 may maintain the gas extraction valve 73 to be opened for the open set time. If the time measured by the timer reaches the open set time after the gas extraction valve is opened, the controller 109 may compare a difference between the first pressure P1 and the second pressure P2, stored in the data storage part, with the target pressure variation (S907 and S908).

Here, the difference (P2−P1) between the first pressure P1 and the second pressure P2, stored in the data storage part, may be a variation (ΔP) in pressure sensed by the pressure sensor 72 for the close set time.

If the variation (ΔP=P2−P1) in pressure is less than the target pressure variation, the controller 109 may end the primary fermenting process (S900).

If the variation (ΔP=P2−P1) in pressure is equal to or greater than the target pressure variation, the controller 109 may return to the process of closing the gas extraction valve 73 so as to re-sense a fermentation degree, store, in the data storage part, a new first pressure P1 sensed by the pressure sensor 72 at the point of time when the gas extraction valve 73 is closed, and then repeat the process (S908 and S903).

When the primary fermenting process (S900) is ended, the controller 109 may turn off the gas extraction valve 73 being in the on-state (S908 and S909).

After the primary fermenting process (S900) is ended, the controller 109 may initiate the secondary fermenting process (S1000).

Figure 19:
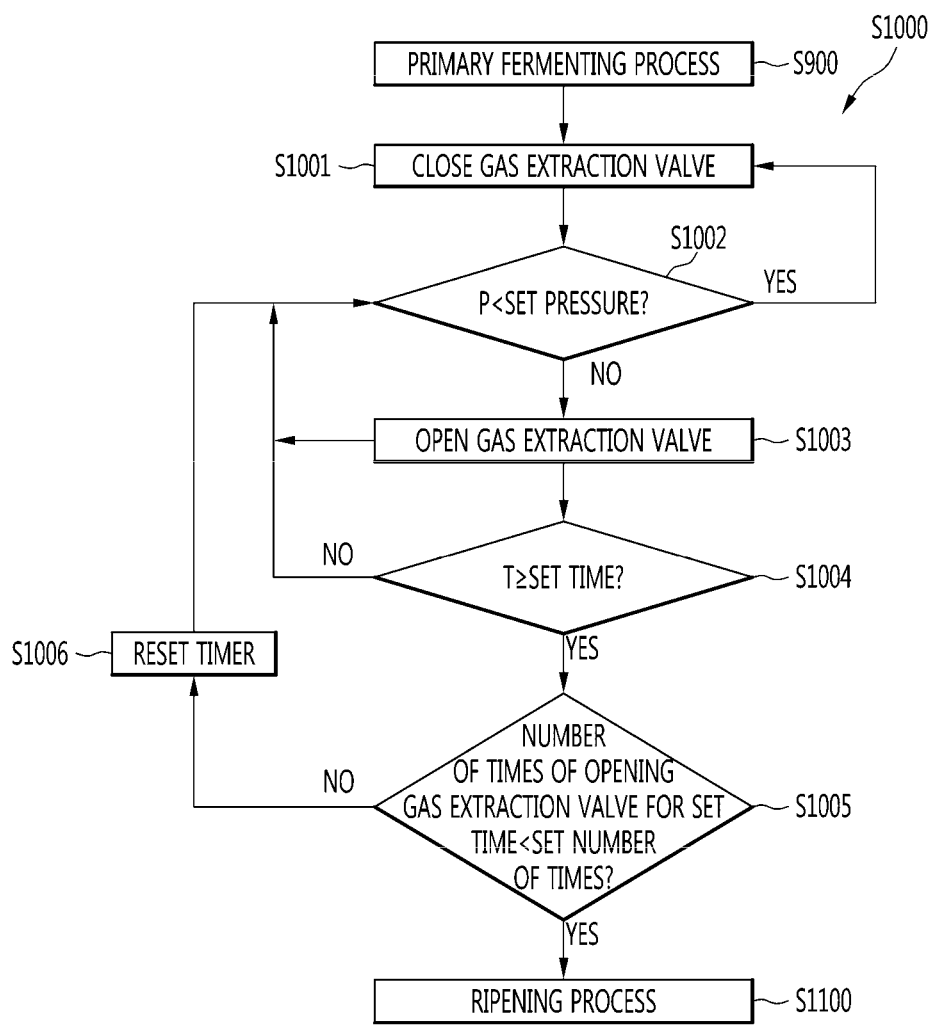
FIG. 19 is a flowchart illustrating another example of the secondary fermenting process shown in FIG. 13.

FIG. 19 is a flowchart illustrating another example of the secondary fermenting process shown in FIG. 13.

If the primary fermenting process (S900) is ended, the secondary fermenting process (S1000) may be initiated.

If the secondary fermenting process (S1000) is initiated, the controller 109 may maintain the gas extraction valve 73 to be closed (S1001).

When the secondary fermenting process (S1000) is initiated, the controller 109 may turn on a timer counting times.

The controller 109 may compare a pressure sensed by the pressure sensor 72 with a set pressure (S1002).

If a sensed value P of the pressure sensor 72 exceeds the set pressure in the secondary fermenting process (S1000), the gas extraction valve 73 may be opened (S1002 and S1003).

In addition, if the sensed value P of the pressure sensor 72 is equal to or less than the set pressure in the secondary fermenting process (S1000), the gas extraction valve 73 may be closed (S1002 and S1001).

The controller 109 may open or close the gas extraction valve 73 while comparing a pressure sensed by the pressure sensor 72 with the set pressure until before a time elapsing after the secondary fermenting process is initiated (S1001, S1002, and S1003). In addition, the controller 109 may add up number of times of opening the gas extraction valve 73 for a set time.

If the time elapsing after the secondary fermenting process is initiated reaches the set time, the controller 109 may compare the added-up number of times of opening the gas extraction valve 73 with a set number of times (S1004 and 1005).

If the number of times of opening the gas extraction valve 73 is less than the set number of times, the secondary fermenting process may be ended (S1005 and S1100).

If the number of times of opening the gas extraction valve 73 is equal to or greater than the set number of times, the secondary fermenting process 51000, the opening and closing of the gas extraction valve 73 according to the sensed value P of the pressure sensor 72 may be repeated in the secondary fermenting process (S1000) (S1001, 51002, 51003, and S1004).

The set time is a time preset to determine whether the secondary fermenting process is ended, and may be set shorter than a ripening set time of the ripening step (S1100).

For example, if the set time is set to 12 hours, it may be determined whether the secondary fermenting process (S1000) has been ended, according to a number of times of opening the gas extraction valve 73 for 12 hours.

In addition, the set number of times may be set to a specific number of times such as once, twice, or three times.

As an example, if the set number of times is set to once, the secondary fermenting process (S1000) may be ended when the gas extraction valve 73 is not opened for the set time.

As another example, if the set number of times is set to three times, the secondary fermenting process (S1000) may be ended when the gas extraction valve 73 is not opened for the set time or when the gas extraction valve 73 is opened once or twice for the set time. On the other hand, if the gas extraction valve 73 is opened three times or more for the set time, the secondary fermenting process may not be ended.

It may be determined whether the secondary fermenting process (S1000) has been ended, using the set time as a period. If the secondary fermenting process S1000 is not ended when it is initially determined whether the secondary fermenting process S1000 has been ended, the timer counting times is reset to 0, and the above-described process is again repeated for the same set time (S1006, S1001, S1002, S1003, and S1004).

As the fermentation of beverage is gradually ended, a change in pressure sensed by the pressure sensor 72 may be gradually decreased. If the number of times of opening the gas extraction valve 73 is less than the set number of times for the set time after it is determined once whether the secondary fermenting process has been ended, the secondary fermenting process (S1000) may be ended.

Meanwhile, the flow path including the main flow path 2, the water supply flow path 4, the beverage extraction flow path 61, the gas extraction flow path 71, the air injection flow path 81, the air supply flow path 154, and the like, which are described in the present disclosure, may be formed a hose or tube through which a fluid can pass. The flow path may be configured with a plurality of hoses or tubes continued in the length direction thereof. The flow path may include two hoses or tubes disposed with another component such as a control valve, interposed therebetween.

The foregoing implementations are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary implementations described herein may be combined in various ways to obtain additional and/or alternative exemplary implementations.

As the present features may be implemented in several forms without departing from the characteristics thereof, it should also be understood that the above-described implementations are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. An apparatus comprising:
a fermentation tank having a first space formed therein and an opening that communicates with the first space;
a refrigerant tube wound around an outer surface of the fermentation tank;
a compressor connected to the refrigerant tube;
an ingredient pack accommodated in the first space of the fermentation tank through the opening of the fermentation tank, the ingredient pack having a second space that is smaller than the first space and that includes fermentation ingredients, the ingredient pack being configured to limit a mixture of water and the fermentation ingredients from contacting an interior wall of the fermentation tank;
a fermentation tank cover configured to open and close the opening of the fermentation tank and to cover the ingredient pack;
a gas extraction flow path that is connected to the fermentation tank cover;
a gas extraction valve disposed in the gas extraction flow path and configured to discharge gas from the ingredient pack;
a pressure sensor disposed on at least one of the gas extraction flow path or the fermentation tank cover; a temperature sensor connected to the fermentation tank;
a plurality of ribs formed along top-bottom direction of the fermentation tank and are spaced apart from one another in the circumferential direction of the inner surface of fermentation tank; and
a controller that includes a processor and that is configured to control the gas extraction valve and the compressor,
wherein the controller is configured to:
perform a primary fermentation for generating alcohol and carbon dioxide by guiding air through the ingredient pack,
perform a secondary fermentation for limiting overpressure in the ingredient pack caused by the carbon dioxide generated during the primary fermentation,
perform ripening after the secondary fermentation in which a temperature of beverage is maintained between an upper limit value of a set ripening temperature and a lower limit value of the set ripening temperature,
measure, while performing the primary fermentation, a change of pressure detected by the pressure sensor, and
control, based on the measured change of pressure, the gas extraction valve,
wherein the controller is configured to perform the primary fermentation by:
controlling the gas extraction valve to open during a first predetermined time,
controlling the gas extraction valve to close after the first predetermined time,
controlling the pressure sensor to measure, based on the gas extraction valve being closed, a first pressure and a second pressure at predetermined time intervals,
controlling the gas extraction valve to open during a second predetermined time, and
based on a difference between the first pressure and the second pressure being less than a predetermined change of pressure, controlling the gas extraction valve to close after the second predetermined time, terminating the primary fermentation and initiating the secondary fermentation, and
wherein the controller is configured to perform the secondary fermentation by controlling the gas extraction valve to close, opening or closing the gas extraction valve to maintain pressure detected by the pressure sensor within a predetermined range during the secondary fermentation, based on the number of times the gas extraction valve being turned on being less than a predetermined number of times, terminate the secondary fermentation, and initiate the ripening,
wherein the controller is configured to perform the ripening by:
closing the gas extraction valve during a ripening predetermined time,
controlling the temperature sensor to measure, based on the gas extraction valve being closed, a first temperature and a second temperature at a predetermined time interval,
based on a difference between the first temperature and the second temperature, controlling the compressor,
after the ripening predetermined time elapses, completing the ripening process,
wherein the ingredient pack comprises:
a pack main flow path defined in an inner hollow part of the ingredient pack, and
at least one gas discharge flow path defined in a vicinity of the pack main flow path in the ingredient pack,
wherein the fermentation tank cover comprises:
a flow path body including (i) a sub-flow path part that is in communication with the at least one gas discharge flow path and (ii) a main flow path part that is in contact with an upper portion of the pack main flow path and that is in communication with the pack main flow path, and
a lower sealing member that is connected to the ingredient pack,
wherein the lower sealing member includes a communication path that guides gas extracted from the at least one gas discharge flow path to the sub-flow path part, and
wherein, based on the fermentation tank cover covering the opening of the fermentation tank, a lower portion of the main flow path part is in communication with the pack main flow path, and the at least one gas discharge flow path, the communication path, and the sub-flow path part are sequentially connected to each other.

2. The apparatus of claim 1, wherein the pressure sensor is disposed on the gas extraction flow path at a position that is closer to the fermentation tank than a position of the gas extraction valve.

3. The apparatus of claim 1, wherein the controller is configured to control the gas extraction valve and the pressure sensor to measure a pressure inside the gas extraction flow path using the pressure sensor while the gas extraction valve stops a discharge of gas from the ingredient pack through the gas extraction flow path.

4. The apparatus of claim 1, wherein the controller is configured to, based on the pressure sensor detecting a decrease in pressure in the gas extraction flow path, control the gas extraction valve to stop a discharge of gas from the ingredient pack through the gas extraction flow path.

5. The apparatus of claim 4, wherein the controller is further configured to control the gas extraction valve to stop a discharge of gas from the ingredient pack through the gas extraction flow path based on the pressure sensor detecting a decrease in pressure in the gas extraction flow path by:
   determining whether the decrease in pressure in the gas extraction flow path is within a threshold amount,
   based on a determination that the decrease in pressure in the gas extraction flow path is within the threshold amount, controlling the gas extraction valve to stop a discharge of gas from the fermentation tank through the gas extraction flow path, and
   based on a determination that the decrease in pressure in the gas extraction flow path is not within the threshold amount, controlling the gas extraction valve to discharge gas from the fermentation tank through the gas extraction flow path.

6. The apparatus of claim 1, wherein the controller is further configured to:
   control the gas extraction valve to stop a discharge of gas from the ingredient pack through the gas extraction flow path, and
   subsequently control the gas extraction valve to discharge gas from the ingredient pack through the gas extraction flow path after a period of time.

7. The apparatus of claim 1, wherein at least one portion of the gas extraction flow path is disposed at the outside of the fermentation tank and the fermentation tank cover, and
   wherein the pressure sensor and the gas extraction valve are disposed at the at least one portion of the gas extraction flow path outside of the fermentation tank and the fermentation tank cover.

8. The apparatus of claim 1, wherein the controller is further configured to:
   receive a user input indicating a target level of carbonation, and
   based on the user input, control the gas extraction valve to discharge gas from the ingredient pack through the gas extraction flow path.

9. The apparatus of claim 1, wherein fermentation tank comprises a seat portion configured to support an upper part of the ingredient pack in a state in which the ingredient pack is accommodated in the fermentation tank, and
   wherein the seat portion is configured to mate with an upper part of the ingredient pack and seal a space between an exterior of the ingredient pack and an interior wall of the fermentation tank.

10. The apparatus of claim 1, wherein, in a state in which the ingredient pack is accommodated in the fermentation tank and the fermentation tank cover is closed, the gas extraction flow path is communicative with a gas discharge opening of the ingredient pack that provides access to an interior of the ingredient pack.

11. The apparatus of claim 1, wherein the pressure sensor is configured to measure a pressure inside the ingredient pack in a state in which the ingredient pack is accommodated in the fermentation tank and the fermentation tank cover is closed.

12. The apparatus of claim 11, wherein the controller is configured to:
   control the gas extraction valve and the pressure sensor to measure a pressure inside the ingredient pack while the gas extraction valve stops a discharge of gas from ingredient pack, and
   based on the pressure sensor detecting a decrease in pressure inside the ingredient pack, control the gas extraction valve to stop a discharge of gas from the ingredient pack.

13. The apparatus of claim 1,
   wherein the primary fermentation is performed in a state in which the temperature of the fermentation tank reaches a first target temperature, and the secondary fermentation is performed in a state in which the temperature of the fermentation tank reaches a second target temperature.

14. The apparatus of claim 13, wherein the controller is further configured to:
   terminate, based on the number of times of opening the gas extraction valve per predetermined time being less than a predetermined number of times, the secondary fermentation.

* * * * *